(12) United States Patent
Katayama et al.

(10) Patent No.: US 6,236,752 B1
(45) Date of Patent: *May 22, 2001

(54) IMAGE FORMING APPARATUS AND METHOD FOR SELECTING PRINT HEADS ESPECIALLY FOR BARCODES

(75) Inventors: Akira Katayama; Yuzo Wada, both of Yokohama; Kohei Ishikawa, Kawasaki; Shinichi Saijo, Yokohama; Kenichi Moritoki, Higashiyamato, all of (JP)

(73) Assignee: Canon Aptex Kabushiki Kaisha, Mitsukaido ( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/922,530

(22) Filed: Sep. 3, 1997

(30) Foreign Application Priority Data

Sep. 5, 1996 (JP) .................................................. 8-234803
Sep. 18, 1996 (JP) .................................................. 8-246318

(51) Int. Cl.⁷ .............................................. G06K 9/18
(52) U.S. Cl. ........................................ 382/183; 395/106
(58) Field of Search .......................... 382/183; 395/104, 395/106, 109, 112, 117

(56) References Cited

U.S. PATENT DOCUMENTS

| | | |
|---|---|---|
| 4,313,124 | 1/1982 | Hara . |
| 4,345,262 | 8/1982 | Shirato et al. . |
| 4,459,600 | 7/1984 | Sato et al. . |
| 4,463,359 | 7/1984 | Ayata et al. . |
| 4,558,333 | 12/1985 | Sugitani et al. . |
| 4,608,577 | 8/1986 | Hori . |
| 4,723,129 | 2/1988 | Endo et al. . |
| 4,740,796 | 4/1988 | Endo et al. . |
| 4,857,955 * | 8/1989 | Crandall ............................... 355/328 |
| 5,584,589 * | 12/1996 | Adkins et al. ........................ 400/586 |
| 5,596,355 * | 1/1997 | Koyama et al. ........................ 347/43 |
| 5,777,758 * | 7/1998 | Tanabe ................................. 358/457 |
| 5,841,954 * | 11/1998 | Ackley ................................. 395/108 |

FOREIGN PATENT DOCUMENTS

| | | |
|---|---|---|
| 0 340 898 | 11/1989 | (EP) . |
| 0 361 780 | 4/1990 | (EP) . |
| 0 493 085 | 7/1992 | (EP) . |
| 0 596 467 | 5/1994 | (EP) . |
| 54-56847 | 5/1979 | (JP) . |
| 59-123670 | 7/1984 | (JP) . |
| 59-138461 | 8/1984 | (JP) . |
| 60-71260 | 4/1985 | (JP) . |
| 3-276021 | 12/1991 | (JP) . |
| 5-254180 | 10/1993 | (JP) . |
| 6-031955 | 2/1994 | (JP) . |
| 7-25073 | 1/1995 | (JP) . |

* cited by examiner

*Primary Examiner*—Yon J. Couso
(74) *Attorney, Agent, or Firm*—Fitzpatrick, Cella, Harper & Scinto

(57) ABSTRACT

Upon reaction of data from a host computer, an image forming apparatus analyzes the data, and maps bitmap images onto corresponding image memories in accordance with the analysis result. When it is determined that the data includes a barcode image, non-barcode image data mapped on the black image memory is OR-mapped onto the cyan, magenta, and yellow image memories. The barcode image is mapped onto the black image memory to print.

33 Claims, 21 Drawing Sheets

PORTION OF INTEREST

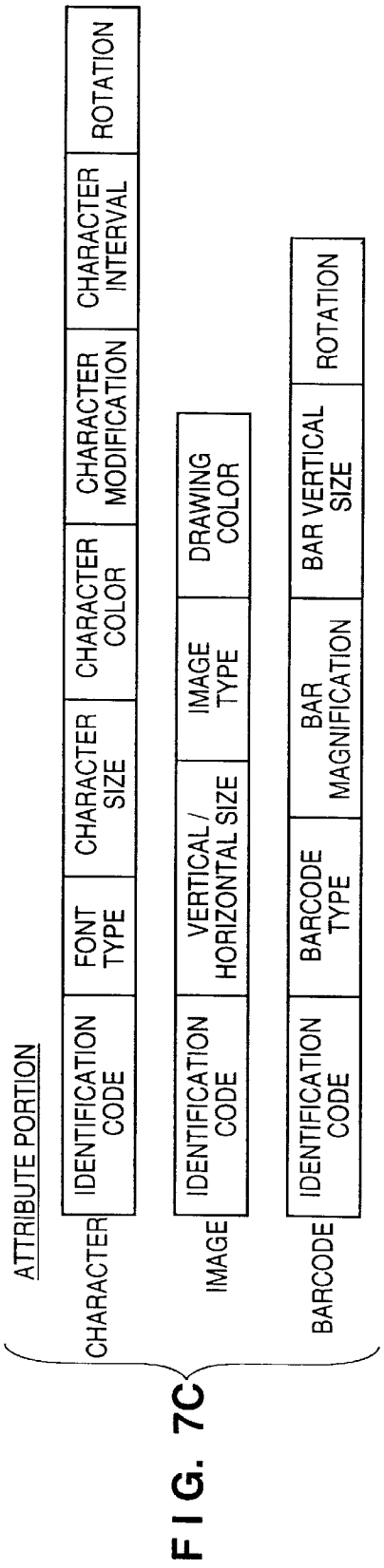

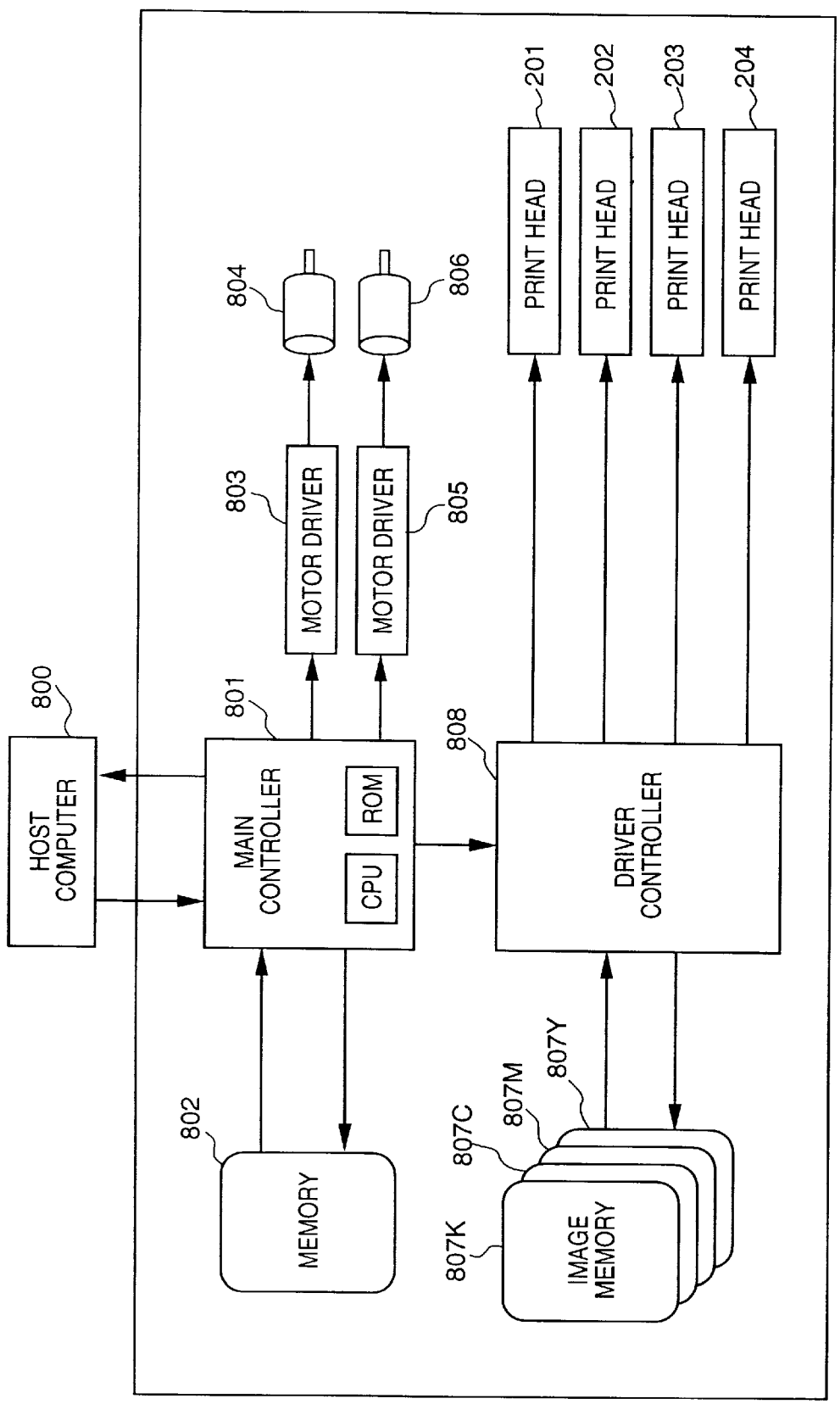

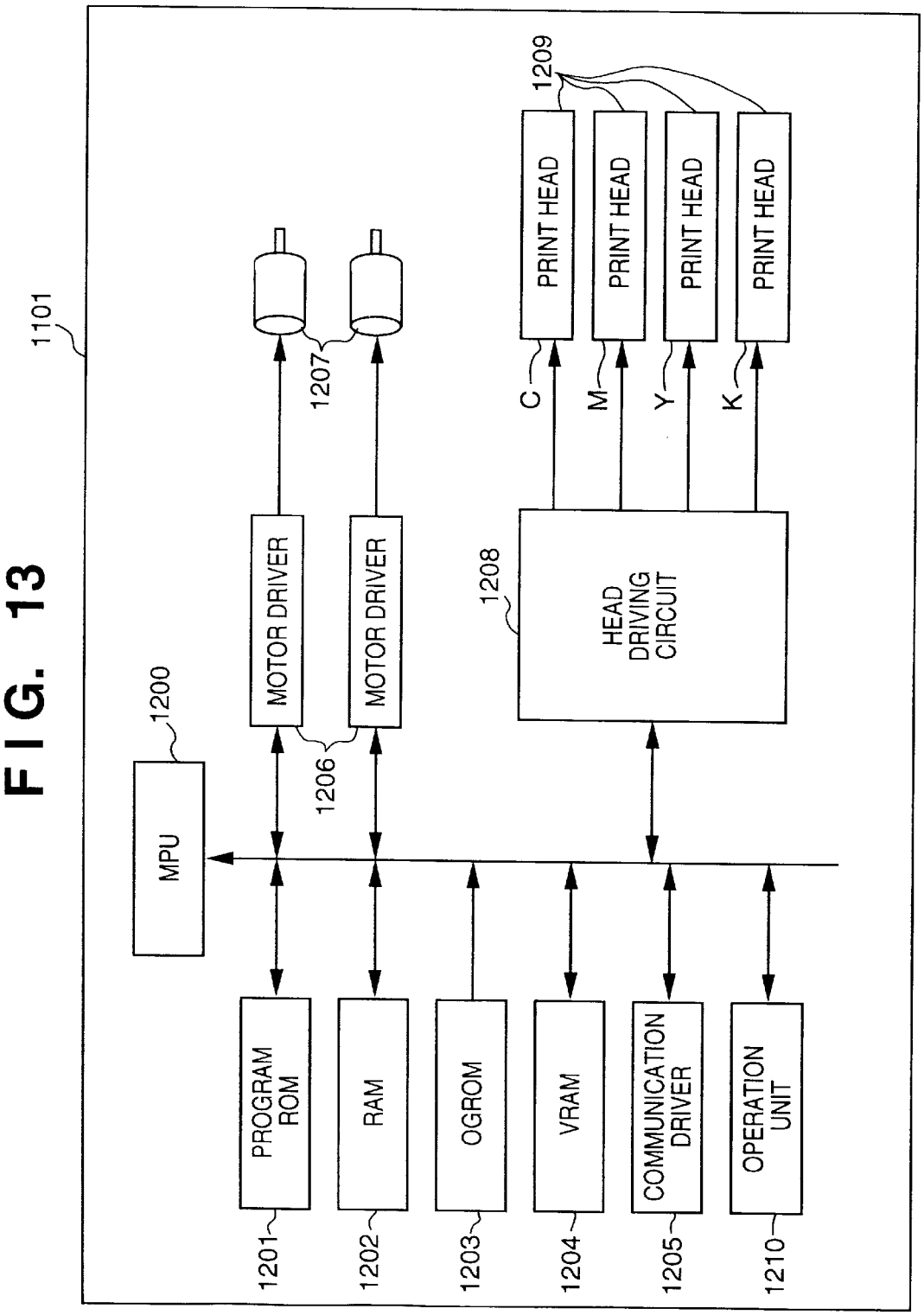

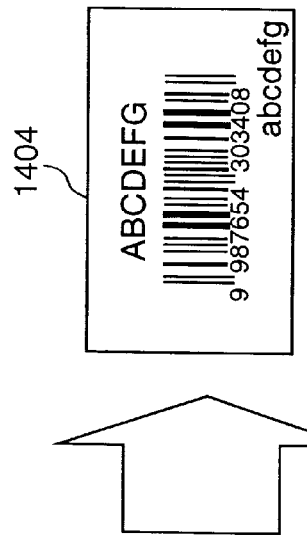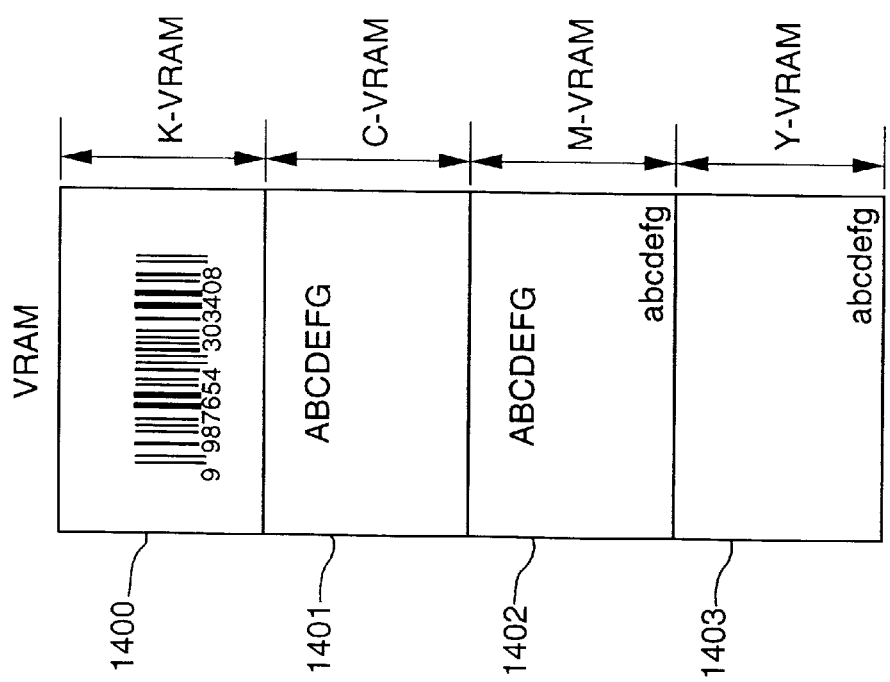

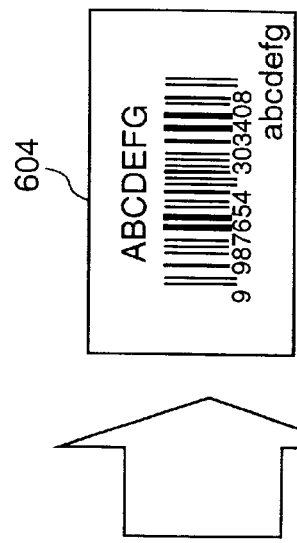
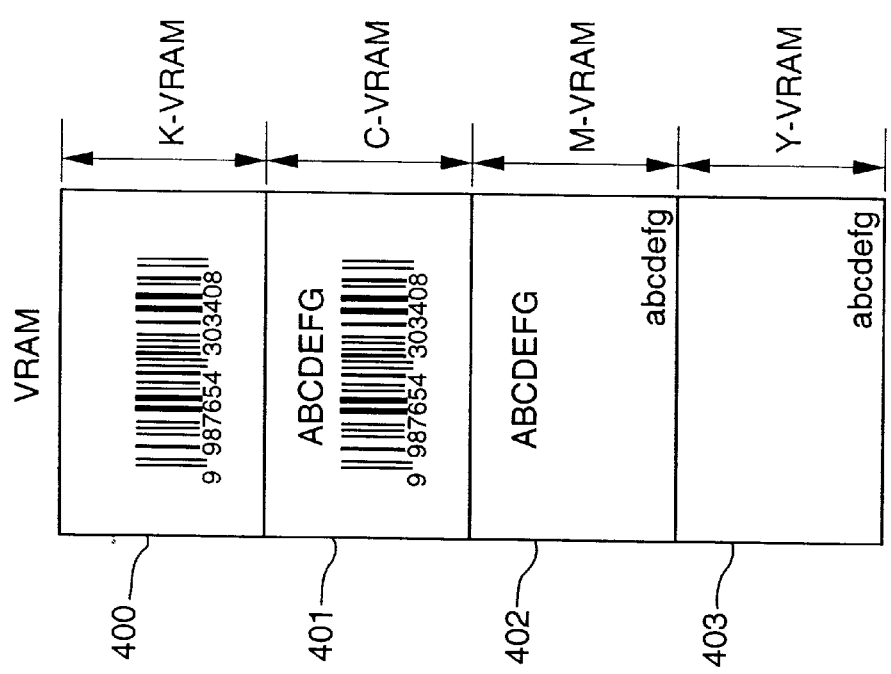

FIG. 18A CHARACTER

ATTRIBUTE PORTION

| IDENTIFICATION CODE | FONT TYPE | CHARACTER SIZE | CHARACTER MODIFICATION | CHARACTER INTERVAL | ROTATION |
|---|---|---|---|---|---|

FIG. 18B IMAGE

ATTRIBUTE PORTION

| IDENTIFICATION CODE | VERTICAL/HORIZONTAL SIZE |
|---|---|

FIG. 18C BARCODE

ATTRIBUTE PORTION

| IDENTIFICATION CODE | BARCODE TYPE | BAR MAGNIFICATION | BAR VERTICAL SIZE | ROTATION |
|---|---|---|---|---|

FIG. 18D

DATA PORTION

| DATA LENGTH | DATA |
|---|---|

IMAGE FORMING APPARATUS AND METHOD FOR SELECTING PRINT HEADS ESPECIALLY FOR BARCODES

BACKGROUND OF THE INVENTION

The present invention relates to an image forming apparatus and method for forming an image on a predetermined printing medium and, more particularly, to an image forming apparatus and method suitable for printing a barcode on a printing medium.

In general, various printing apparatuses for printing on printing media (to be referred to as a printing sheet hereinafter) such as a paper sheet, cloth, plastic sheet, OHP sheet, and the like have been proposed, and they can include print heads based on various printing schemes, e.g., a wire-dot scheme, thermal scheme, thermal transfer scheme, and ink-jet scheme.

Of these schemes, an ink-jet scheme which is one of a class of low-noise, non-impact schemes that eject ink continous schemes (including a charge particle control scheme and spray scheme) and on-demand schemes (including a piezoelectric scheme, spark scheme, bubble-jet scheme) depending on their ink droplet forming methods and generation methods of ejection energy.

In the continous scheme, ink is continuously ejected, and charges are given to only a required number of ink droplets. The charged ink droplets become attached to a printing sheet, but other ink droplets are wasted. In contrast to this, in the on-demand scheme, since ink is ejected only as required for printing, ink is not wasted, and the interior of the apparatus is not contaminated with ink.

In the on-demand shcme, since ink ejection is repetitively started and stopped, the response frequency is lower than that in the continous scheme. For this reason, the on-demand scheme realizes high-speed printing by increasing the number of nozzles that ejext ink droplets. Hence, most of currently commercially available printing apparatuses adopt the on-demand scheme, and printing apparatus with such ink-jet print head is commercially available in the form of output means of an information processing system, e.g., a copying machine, facsimile apparatus, wordprocessor, a printer as an output terminal of a personal computer or the like, and the like, since it can attain high-density, high-speed printing.

An ink-jet printing apparatus commonly comprises a print head, an ink tank that supplies ink to the print head, a conveyance means for conveying a printing sheet, and a control means for controlling these components. A carriage that mounts the print head for ejecting ink droplets from a plurality of orifices is serially scanned in a direction perpendicular to the conveyance direction of a printing sheet, and the printing sheet is intermittently conveyed by an amount equal to a printing width in a non-printing state. By repeating such operations, a significant, two-dimensional image is printed. This printing method prints by ejecting ink onto a printing sheet in correspondence with a print signal, and is widely used as a silent printing method with low running cost.

When a full-line print head on which nozzles for ejecting ink are arranged on a line in correspondence with the paper width of a printing sheet is used, printing for the paper width is attained by continuously conveying the printing sheet in a direction perpendicular to the nozzle array of the print head. With this print head, higher-speed printing can be accomplished.

Furthermore, a color ink-jet printing apparatus forms a color image by overstriking ink droplets ejected by a plurality of color print heads. In general, in order to perform color printing, three print heads corresponding to three primary colors, i.e., yellow (Y), magenta (M), and cyan (C), or four print heads corresponding to black (Bk) in addition to the above three primary colors, and ink tanks corresponding to the individual heads are required. Recently, an apparatus which mounts such three or four color print heads and can form a full-color image has been put into practical use.

Moreover, in the FA (factory automation) and SA (store automation) fields as well, demand has arisen for dedicated printing apparatuses since they can timely output commodity management labels/tags printed with color commodity pictures, distribution labels that classify destinations by colors, and POP and shelf display labels/tags in retail stores, convenience stores, and the like. Such printing apparatus comprises a barcode generator since it must print barcodes for management in the individual fields.

The demand for the ink-jet printing apparatuses as excellent printing means is increasing in various industrial fields (e.g., apparel industry), and also, further improvement of image quality is being sought.

As energy generation means for generating energy for ejecting ink in an ink-jet print head, an electromechanical energy conversion element such as a piezoelectric element or the like is used, as described above, or an electro-thermal conversion element having a heating resistor is used to heat ink.

Of such means, a print head (so-called bubble-jet head) that ejects ink using heat energy (using a film boiling phenomenon) can attain high-resolution printing since the ink orifices can be arranged at high density.

In order to achieve stably readable barcode printing by the ink-jet print head arranged in the ink-jet printing apparatus with the above arrangement, stable ejection and a constant line thickness ratio of barcodes must be maintained to print barcodes that comply with barcode standards.

Such requirements can be met by, e.g., temperature control of the heads to stabilize the ejection amount.

However, in the distribution and FA fields, and the like, a large quantity of printing is often done per job, and it is hard to stabilize the ejection amount by the conventional temperature control alone. As the number of prints per job becomes larger, the ejection amount increases, and the black bars of barcodes become thicker. As a result, stable reading precision cannot be assured.

In general, in a dedicated barcode printing apparatus that exclusively prints barcodes, a single print head is arranged, and prints barcodes by a monochrome thermal transfer or ink-jet method. Even when a versatile printing apparatus is used, barcodes are normally printed using a single color. Hence, in a color printing apparatus having a plurality of heads as well, barcodes are normally printed using a single color (in general, black).

In barcode printing by a print head for printing a barcode, troubles inherent to the printing schemes (e.g., disconnection of a head, skewing of a ribbon, or the like in the thermal transfer scheme; ejection errors of a head, mislanding of ink, or the like in the ink-jet scheme) are fatal. That is, when a barcode printed using the printing apparatus that has suffered such troubles is read using a barcode reader, reading errors occur or such barcode cannot be read. For this reason, in the above-mentioned conventional barcode printing method, barcode printing is disabled when such troubles have occurred.

SUMMARY OF THE INVENTION

The present invention has been made in consideration of the conventional problems and has as its object to provide an image forming apparatus and method, which can form a satisfactory image in a normal image forming mode, and can also maintain high precision of a print result such as a barcode by preventing an increase in use frequency of a print head used for at least a specific image such as a barcode that requires high precision.

In order to achieve the above object, an image forming apparatus according to the present invention comprises the following arrangement.

An image processing apparatus is provided for controlling an image forming unit for forming an image using a plurality of heads, comprising:

determination means for determining if information from which an image is to be formed includes information associated with a barcode; and control means for, when the determination means determines that the information from which an image is to be formed includes information associated with a barcode, controlling the image forming unit to perform image formation by assigning a first head that prints a bitmap image of the barcode alone, and assigning other heads to an image other than the barcode.

Since the first head is used to print barcodes alone, its use frequency upon printing is reduced. For this reason, high printing precision of barcodes by the first head can be maintained.

It is another object of the present invention to provide an image forming apparatus and method, which can print a barcode that can be recognized even when some troubles have occurred in a print head for printing a specific image such as a barcode.

In order to achieve the above object, a printing apparatus of the present invention comprises the following arrangement.

An image forming apparatus is provided comprising:

image forming means having a plurality of print means;

printing means for printing a visible image based on image data on a printing medium using the image forming means; and control means for controlling the printing means to print a visible image based on specific image data at a substantially identical print position by at least two of the plurality of print means.

For example, assuming that the visual image based on the specific image data is a barcode, even when one print means has suffered a trouble, another print means can print the barcode, and the function of the barcode is not marred.

Preferably, the plurality of print means comprise print heads corresponding to a plurality of color components to form a color image, and the control means controls the printing means to print the visible image based on the specific image data at substantially the identical print position using two of the plurality of print heads. Since a plurality of color components in an apparatus that is capable of color printing are used, the present invention can be applied to a printing system of a conventional color printing apparatus, and can be practiced more easily.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 7A to 7E show the format of print data in the first embodiment;

FIG. 8 is a block diagram of the printing apparatus in the first embodiment;

FIG. 13 is a block diagram showing the control arrangement of the color barcode printing apparatus of the third embodiment;

FIGS. 14A and 14B show the state wherein a print command received from a host computer is mapped on a VRAM 204 by a conventional method;

FIGS. 16A and 16B show the state wherein a print command received from a host computer is mapped on the VRAM 204 using the barcode drawing sequence of the third embodiment;

FIGS. 18A to 18D show the data format of field data according to the fourth embodiment;

DETAILED DESCRIPTION OF THE PREFERRED EMBODIMENTS

Preferred embodiments of the present invention will now be described in detail in accordance with the accompanying drawings.

<First Embodiment>

Figure 1:
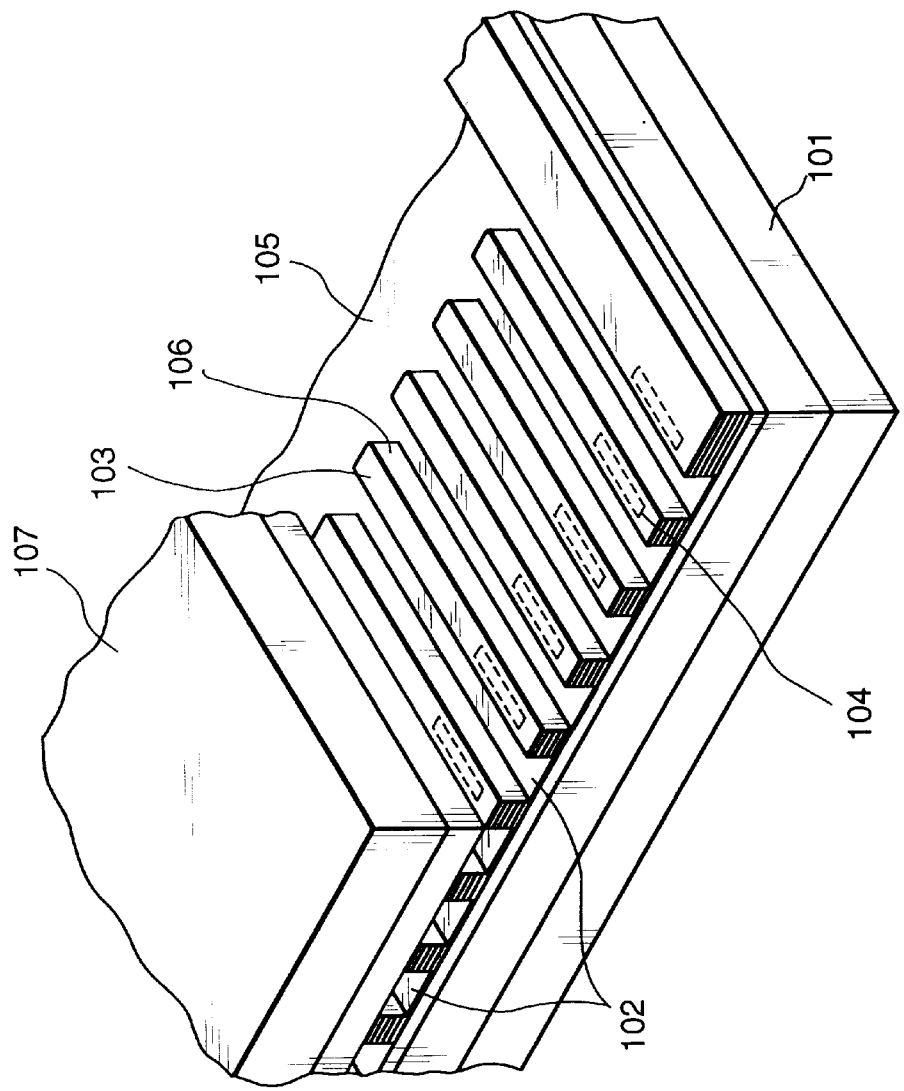
FIG. 1 is a perspective view showing the structure of a print head according to the first embodiment of the present invention.

FIG. 1 is a perspective view for explaining the structure of a bubble-jet print head used in the first embodiment.

Nozzles 106 respectively have corresponding heating members (heaters) 104. When a head driver applies a predetermined energy to the heaters 104, the heaters 104 are heated to form bubbles, and ink droplets are ejected from orifices 102 by the bubbles.

Note that the heaters 104 are formed on a silicon substrate 101 by the same scheme as in a semiconductor fabrication process. Reference numeral 103 denotes nozzle partition walls that define the nozzles 106; 105, a common ink chamber for supplying ink to the nozzles 106; and 107, a top plate.

Figure 2:
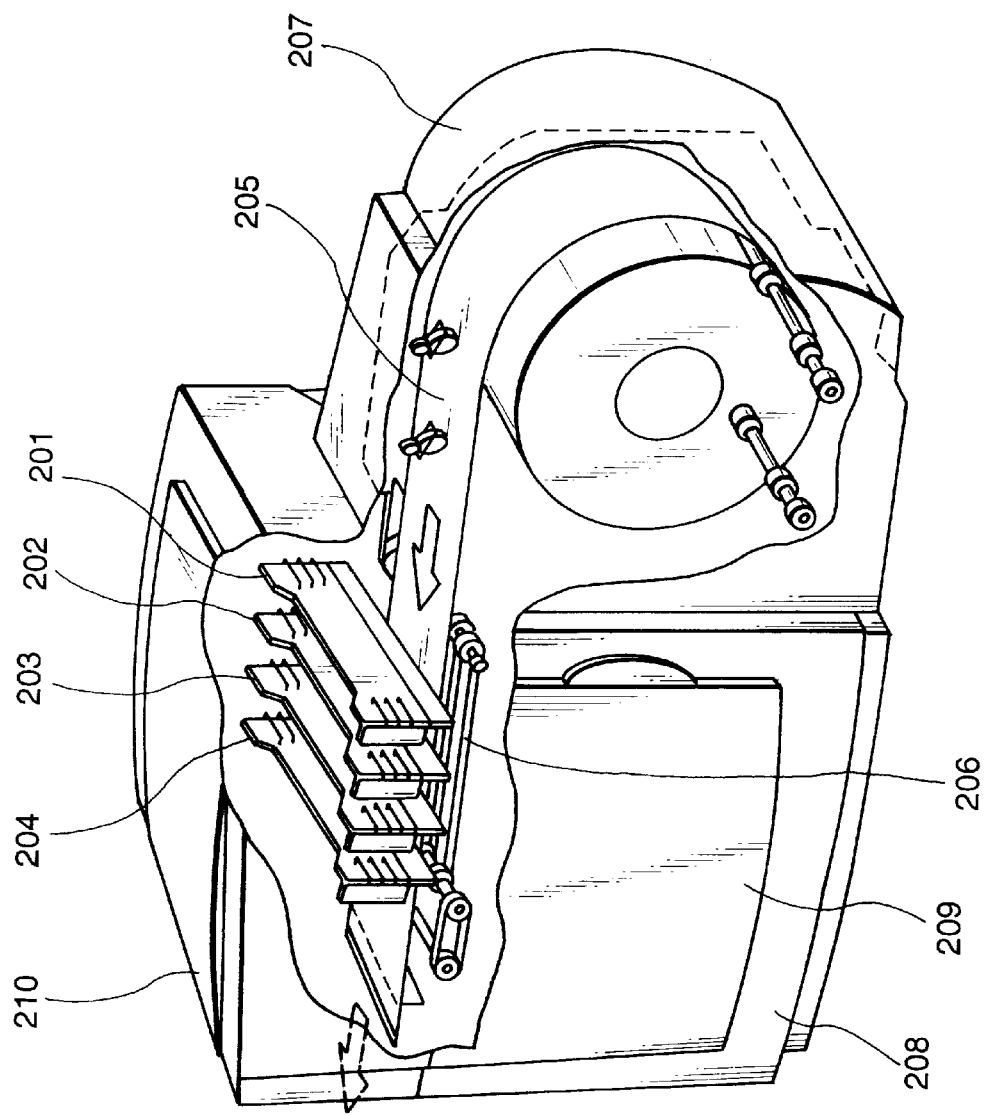
FIG. 2 is a partially cutaway perspective view of a printing apparatus of the first embodiment.

FIG. 2 is a partially cutaway perspective view of an ink-jet printing apparatus of the first embodiment.

A PHS unit 210 is constituted by ink-jet heads 201 to 204, and a recovery system unit (not shown) for always guaranteeing stable ejection. Printing paper 205 is supplied from a roll supply unit 207, and is continuously conveyed by a conveyance unit 206 arranged in a printing apparatus main body 208.

An image is printed as follows. The paper is conveyed, and when the reference position of the paper has moved to a position below the black ink-jet print head 201, that ink-jet print head ejects black ink. Similarly, the cyan, magenta, and yellow ink-jet print heads 202, 203, and 204 eject corresponding color inks in the order named, thus forming a color image.

The printing apparatus main body 208 is constituted by the conveyance unit 206, ink cartridges that store inks to be supplied to the ink-jet print heads, a pump unit used for supplying inks to the print heads, and in recovery, a control board for controlling the entire printing apparatus (the ink cartridges, pump unit, and control board are not shown). A front door 209 is opened/closed when the ink cartridges are exchanged.

Figure 3:
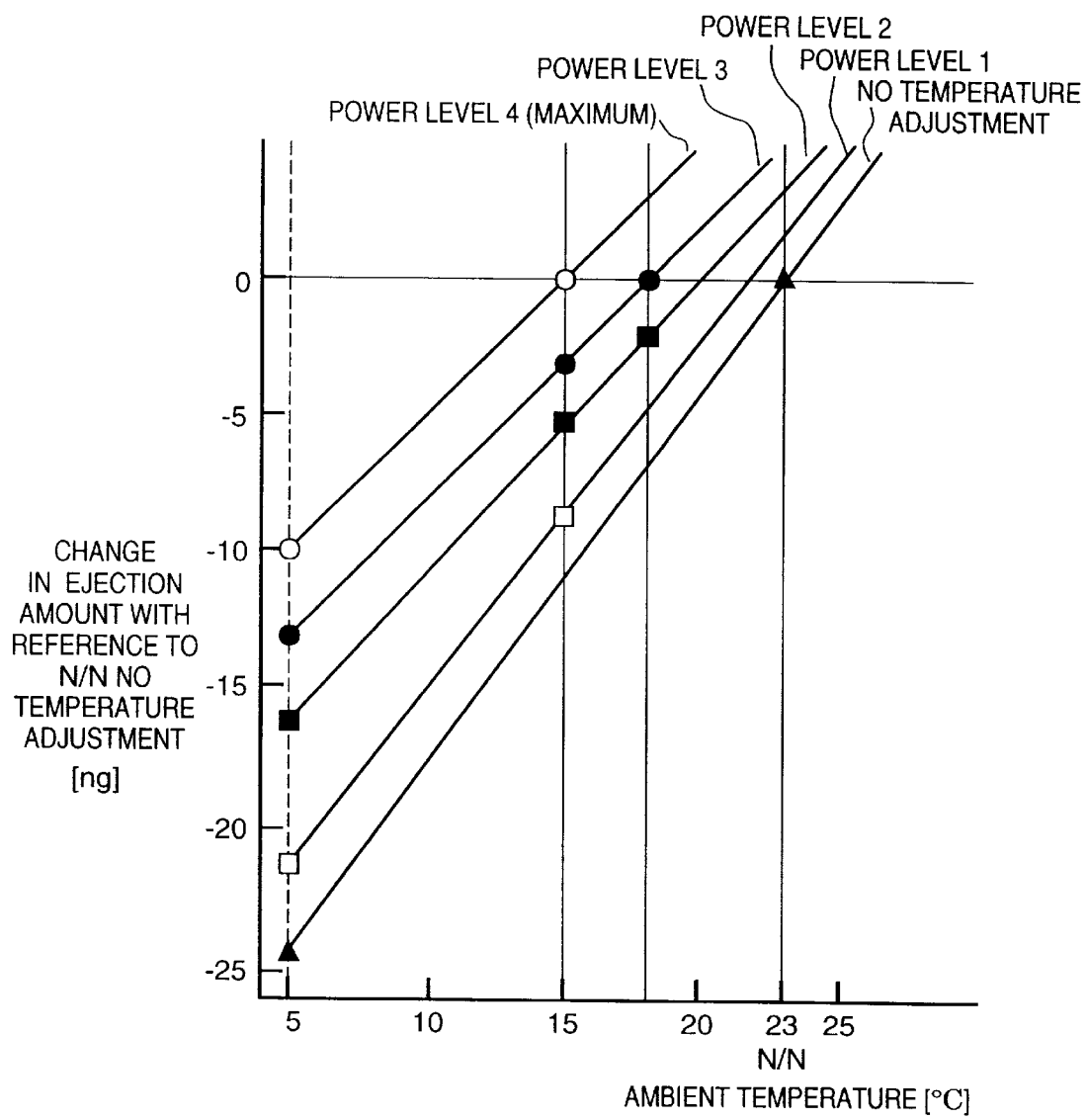
FIG. 3 is a graph showing the relationship between the temperature and changes in ink ejection.
Figure 4:
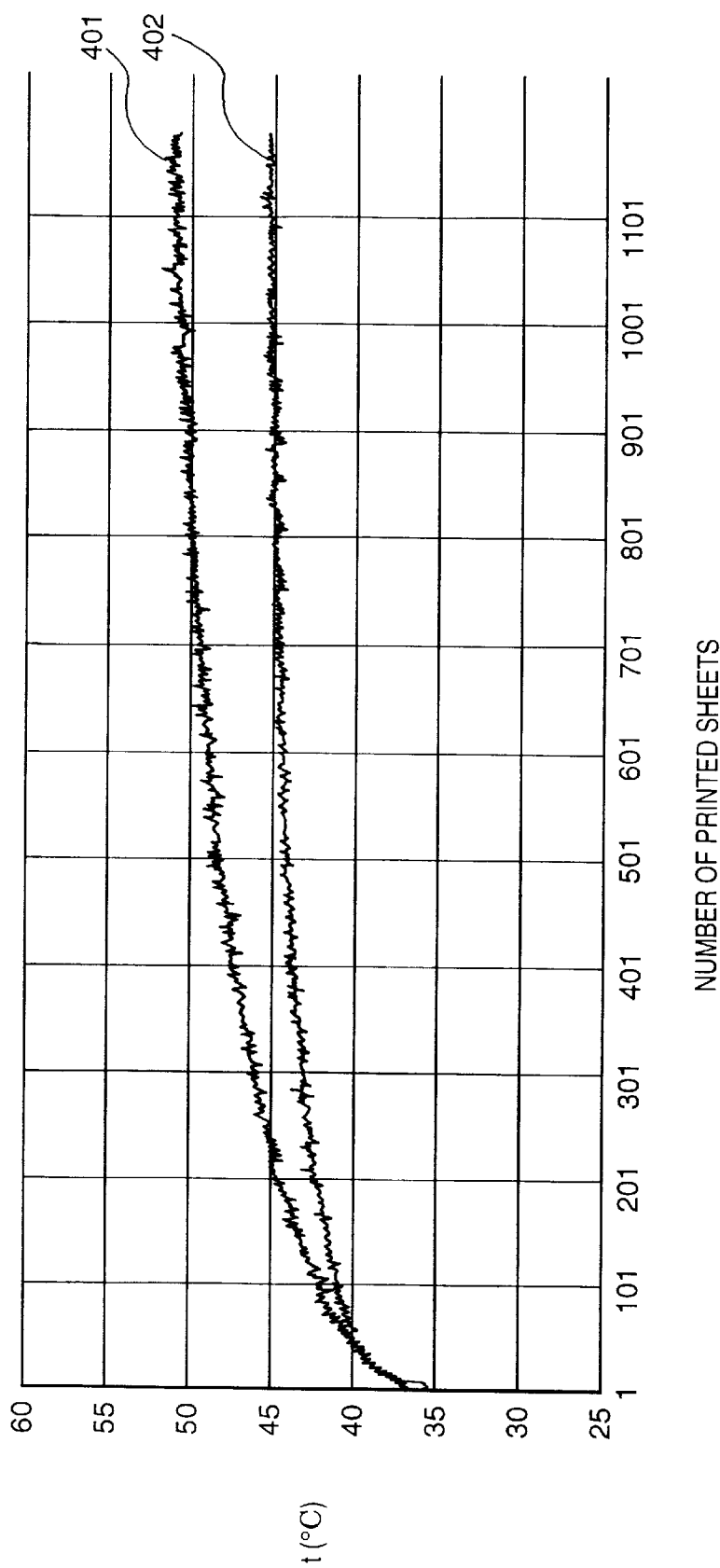
FIG. 4 is a graph showing the differences of changes in head temperature between normal printing, and printing according to the control sequence of the first embodiment.
Figure 5:
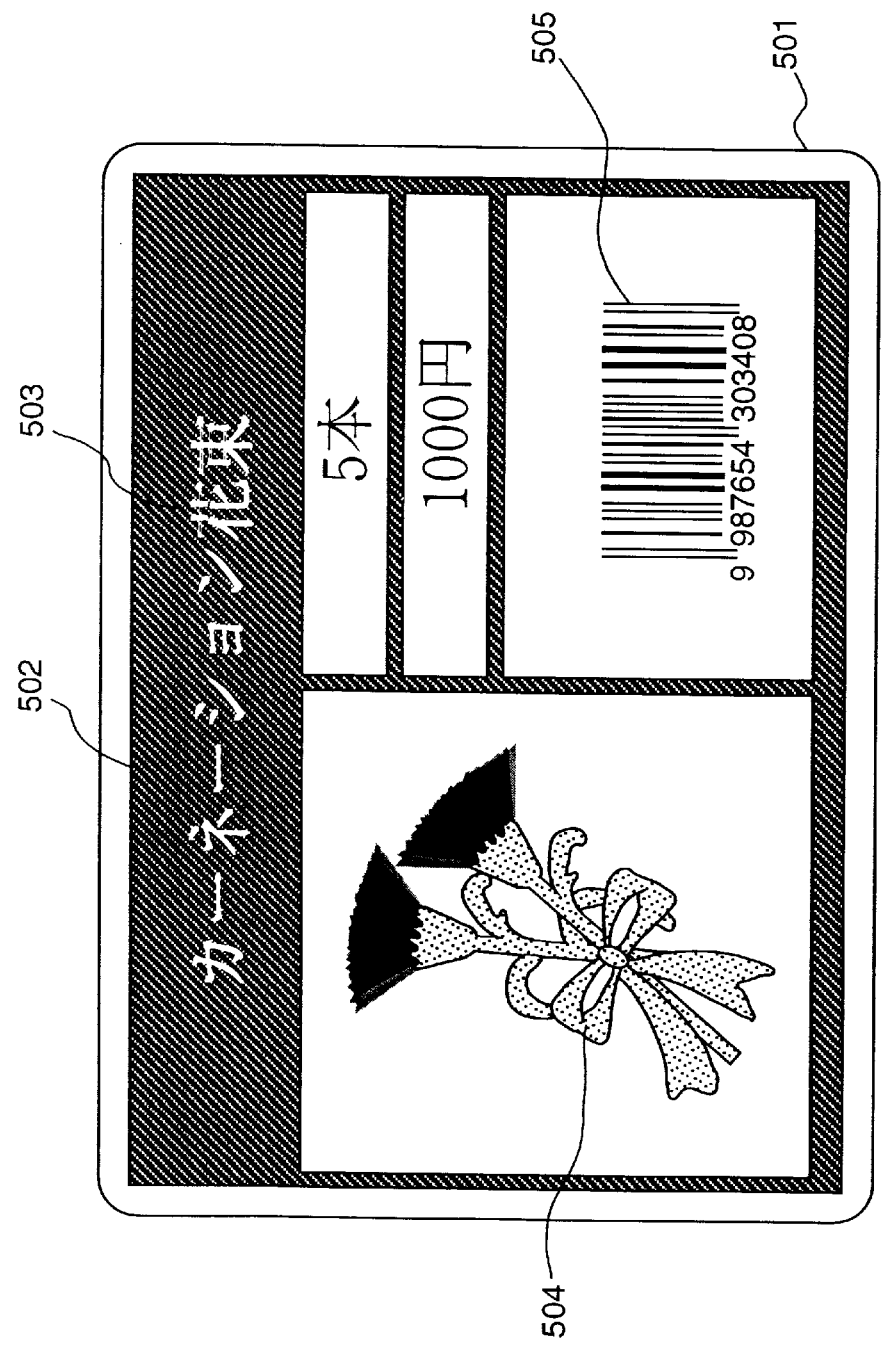
FIG. 5 depicts an example of an image used in the first embodiment.

FIG. 3 is a graph showing the relationship between the temperature and the ejection amount of ink ejected from the ink-jet print head in the first embodiment. FIG. 4 is a graph showing the relationship between the temperature of the ink-jet print head and the number of printed sheets in the first embodiment. FIG. 5 depicts an image sample to be printed by the ink-jet printing apparatus of the first embodiment. As shown in FIG. 5, a black frame 502 and a commodity name 503 are printed in colors on one page (or one sheet) of label paper 501. Also, an illustration 504 of a commodity is drawn in colors, and among these images, a black barcode 505 indicating a commodity code is printed.

Figure 6A:
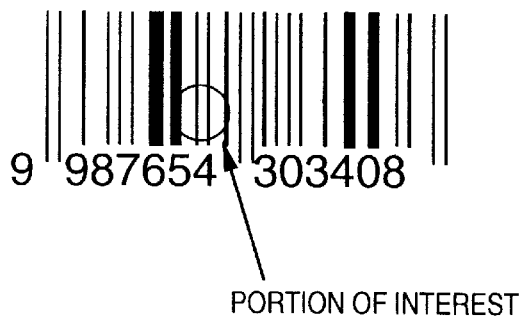
FIGS. 6A, 6B, and 6C show a barcode and variations of bars and the space between the two bars due to changes in print temperature.
Figure 6B:
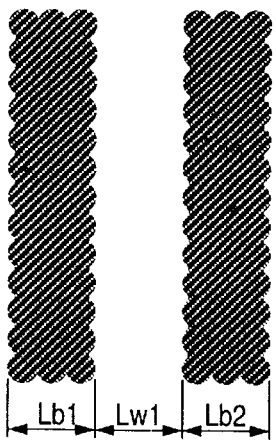
Figure 6C:
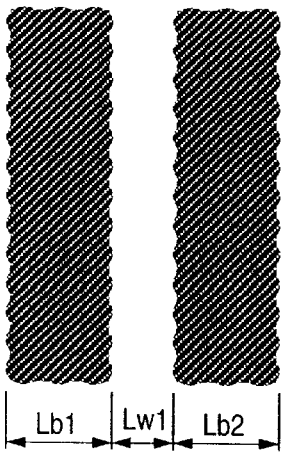

A case wherein the image shown in FIG. 5 is printed in large quantity will be examined below. In such case, the temperature of the ink-jet print head rises with characteristics indicated by a curve 401 in FIG. 4. Upon a temperature rise of the ink-jet print head, the volume of ink droplets ejected onto a print sheet increases as shown in FIG. 3. As a consequence, in the example barcode shown in FIG. 6A, black bars shown in FIG. 6B become those shown in FIG. 6C, and the ratio of black bars to blank spaces has changed. Eventually, it may become impossible to read the barcode.

In view of this problem, in the first embodiment, the presence or absence of barcode print information is discriminated from a print command sent from a host computer in the format shown in FIGS. 7A to 7E. When the print information includes barcode information, black portions of an image to be printed other than the barcode is reproduced by overstriking three colors, i.e., yellow, magenta, and cyan rather than using the black printer head. That is, when an image including a barcode is printed, information to be printed in black is reproduced by driving the yellow, magenta, and cyan heads if it corresponds to a portion other than the barcode, and only the barcode is printed using the black head, thus reducing the use ratio of the black head.

In this manner, by decreasing the number of times the black ink-jet head is driven, a temperature rise of the black print head can be reduced compared to the conventional method (the curve 401 in FIG. 4), as indicated by a curve 402 in FIG. 4.

FIGS. 7A to 7E show the command format of print data from the host computer in this embodiment.

Print data is made up of a start command 701 including setting data as a reference for printing, a plurality of fields 705 as data, and an end command 704 indicating the end of print data. Furthermore, each field 705 is divided into an attribute portion 702 including setting data of various attributes, and a data portion 703. As shown in FIG. 7C, the attribute portion 702 basically includes three different attributes, i.e., a character, image, and barcode, but not all of these attributes are always required. That is, barcodes may or may not be present.

FIG. 8 is a block diagram showing the electrical arrangement of the ink-jet printing apparatus of the first embodiment. The individual constituting elements will be explained below as well as their operations.

Reference numerals 804 and 806 denote motors, which are respectively used for pivoting the roll supply unit 205 and driving the conveyance unit 206. These motors 804 and 806 operate in response to driving signals output from motor drivers 803 and 805 in accordance with an instruction from a main controller 801.

When print image information (print data) in the format shown in FIGS. 7A to 7E is transferred from the host computer, the main controller 801 analyzes fields following the start command, and stores bitmap image data corresponding to data in the data portion in one or a plurality of image memories 807K, 807C, 807M, and 807Y designated via a driver controller 808 on the basis of an output color obtained by the analysis. For example, if red is designated as a print color, image data are mapped and stored in the image memories 807M and 807Y.

Note that the mapping processing to the image memories is done in the order of data types present in the received print data. In this embodiment, the processing is done in the order of character, image, and barcode. For a barcode, the main controller 801 reads data on the basis of data included in the data portion of that barcode from its internal ROM, and generates bitmap image data of the barcode. For image data, upon reception, the image data is written in the corresponding image memory 807. Note that data is written in the image memory by calculating the OR of that data and the previously written data so as to effectively use the information of the previously written data.

In the first embodiment, when the received print data includes barcode information, information (other than the barcode) to be printed in black is reproduced by mixed colors of C, M, and Y. In other words, when the received print data does not include any data associated with a barcode, information (a generated character pattern or image data) to be printed in black is printed using single black color.

In this manner, when no barcode is to be printed, black is not reproduced by mixing colors, thus a high-quality image can be printed. When information associated with a barcode is present, only the barcode is printed using single black color, and other bitmap image data to be printed in black are reproduced by mixing C, M, and Y, thus maintaining high quality of the barcode that requires high precision.

Figure 9:
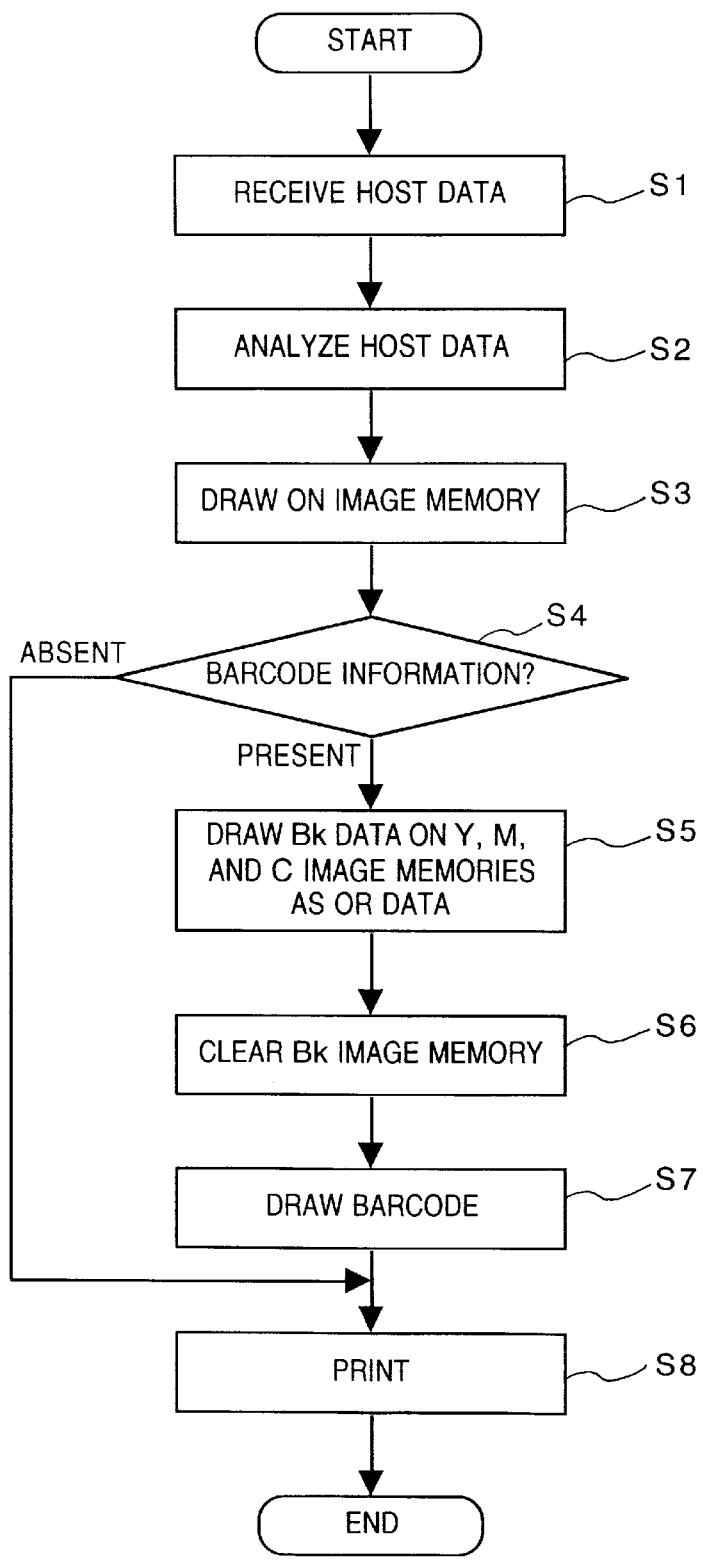
FIG. 9 is a flow chart showing the processing sequence in the first embodiment.

The detailed operation processing sequence in the first embodiment will be described below with reference to the flow chart in FIG. 9.

Print data is received in step S1, and is analyzed in step S2 to discriminate a character or image included in the print data. The flow then advances to step S3, and the character and/or image are written in the corresponding image memories 807K to 807Y to reproduce the designated colors. In this case, if black is designated as an output color, the corresponding character or image is temporarily written in the image memory 807K.

When the flow advances to step S4, it is determine whether the received print data includes information associated with a barcode. In this embodiment, the presence or absence of barcode information is determined by checking whether the received print data includes a field having an attribute portion (FIG. 7C) whose identification code represents "barcode". If it is determined that the received print data does not include any information associated with a barcode, the flow skips steps S5 to S7, and jumps to step S8 to print based on image data mapped on the image memories 807K to 807Y.

On the other hand, if it is determined that the received print data includes information associated with a barcode, the image data mapped on the image memory 807K is OR-mapped on the image memories 807C to 807Y (i.e., that image data is re-mapped by calculating the ORs with the previously mapped image data). The flow then advances to step S6 to clear the data in the image memory 807K. In step S7, a bitmap image corresponding to the barcode is generated, and is mapped on the image memory 807K. Thereafter, the flow advances to step S8.

As a result of the above-mentioned processing, for example, when the print data does not include any barcode, since black printing forms an image using only black ink, a good image can be printed. On the other hand, when the print data includes a barcode, the barcode alone is printed using black ink, and black in other images is reproduced by mixing Y, M, and C, thus maintaining high quality of the barcode.

Hence, even when printing is done in large quantities, high-quality barcodes that do not hinder reading performance can be printed.

In this embodiment, image data of a barcode is generated inside the apparatus unlike other image data. Alternatively, the barcode itself may be received as image data. In this case, information that can identify at least normal image data or barcode image data need only be added.

<Second Embodiment>

Recently, for printing apparatuses (printers) that are connected to personal computers to print, for the purpose of convenience, printers are normally on sale as a set packed together with printer driver software which is installed in a personal computer (host computer) to connect the printer via an interface.

The above-mentioned embodiment (first embodiment) has exemplified the internal processing of the printing apparatus. However, in the second embodiment, as shown in FIG. 10, a printer driver which is packed together with the printing apparatus main body on sale implements the same operation and effects as in the first embodiment.

Figure 10:
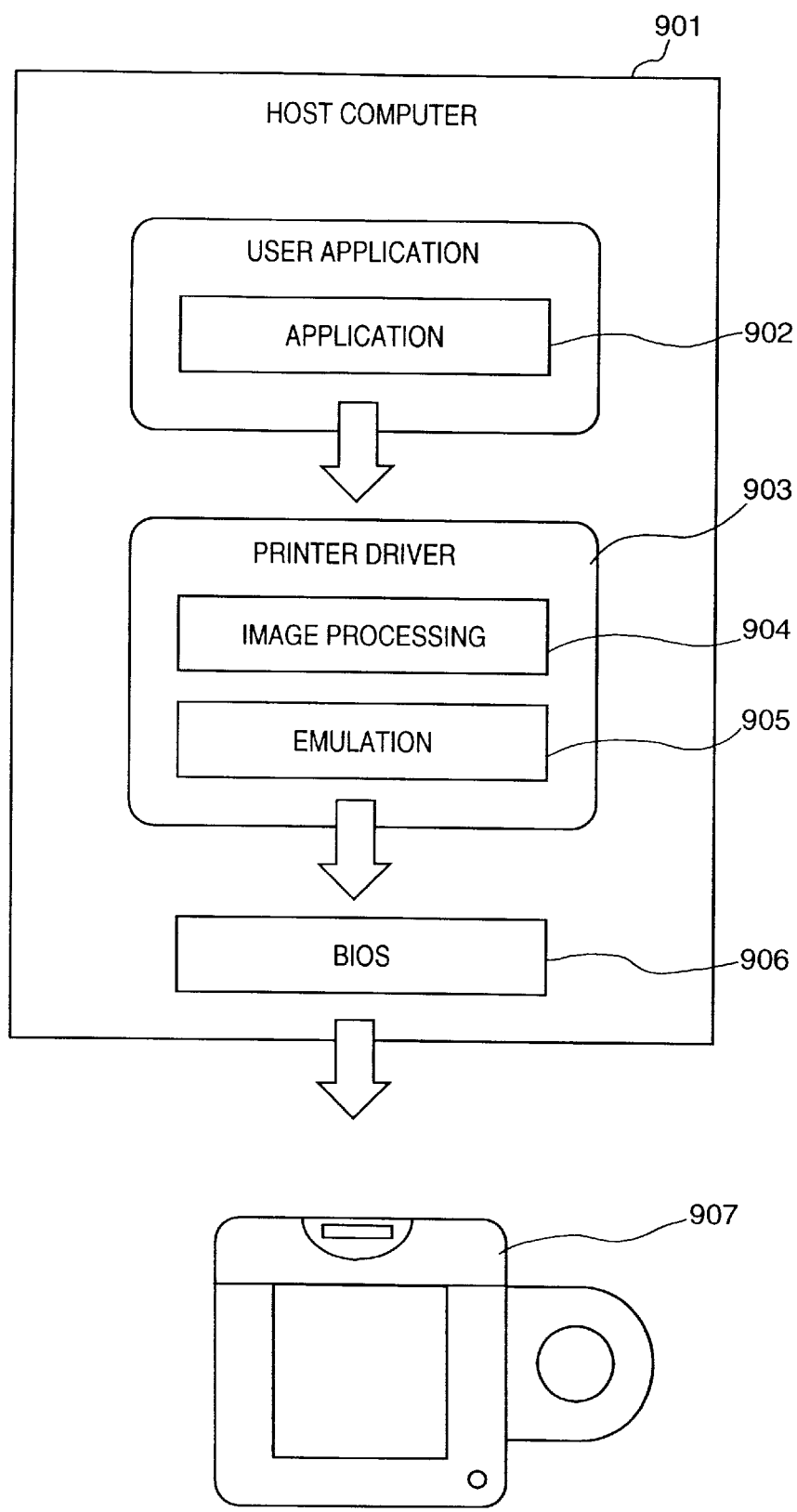
FIG. 10 illustrates the relationship between a printer driver program and a printing apparatus in the second embodiment of the present invention.

FIG. 10 illustrates the software architecture according to the second embodiment of the present invention.

The user creates an image to be printed by a printing apparatus 907 using a user application 902 used in a host computer 901. When the user wants to print, he or she issues a print command from the user application 902 to a printer driver 903, and at the same time, image information created by the user is transferred to the printer driver 903. The printer driver 903 is mainly made up of an image processing portion 904 for converting the image created by the user application 902 into digital information to be transferred to the printer, and an emulation portion 905 for converting the print command from the user application 902 into that for the printer. In this embodiment, the image processing portion 904 of the printer driver 903 checks if the image information transferred from the application 902 includes barcode print information. If the image information includes barcode information, the image processing portion 904 converts black in images to be printed other than the barcode into print information that mixes three colors, i.e., yellow, magenta, and cyan, thus reproducing black. The emulation portion 905 converts the generated print information into a print command for the printing apparatus (printer). The print command is transferred to the printing apparatus 907 via a basic I/O control software program 906 of the host computer 901.

In this case, the printing apparatus 907 has two different black designation commands to be analyzed. One command uses only black color ink, and the other command attains black printing by mixing Y, M, and C.

Figure 11:
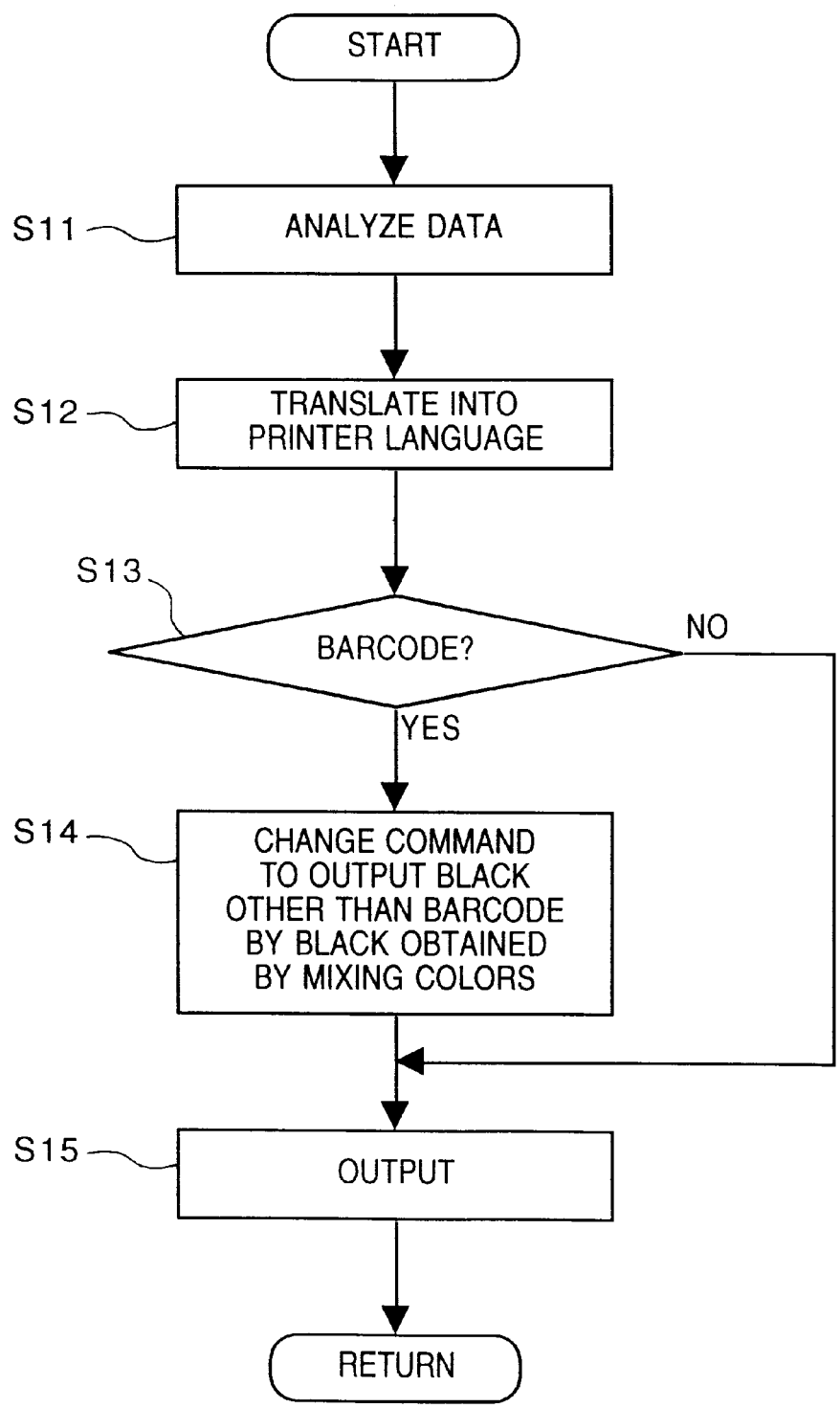
FIG. 11 is a flow chart showing the processing sequence of the printer driver in the second embodiment.

Elaborating on the processing of this embodiment, FIG. 11 shows the sequence of functions as the printer driver.

Data transferred from, e.g., an application is analyzed in step S11, and is translated into a printer language that can be interpreted by the printing apparatus connected, in step S12. The flow advances to step S13 to check if the translated printer language data includes information associated with a barcode. If the data includes information associated with a barcode, the flow advances to step S14 to change the print command associated with black other than the barcode in the already translated printer language data to one for reproducing black by mixing other colors. In step S15, the printer language data is output.

As described above, according to the second embodiment, the printer driver to be installed in the host computer comprises means for discriminating barcode information in an image to be printed transferred from the user application, and means for reproducing black print information other than a barcode by mixing three colors, i.e., yellow, cyan, and magenta depending on the presence or absence of barcode information. In this manner, even when printing is done in large quantities, high-quality barcodes that do not impair reading performance can be printed.

In the second embodiment, the print data is translated into a printer language. Alternatively, the host computer may create and output image data in units of Y, M, C, and Bk color components.

As described above, according to the first and second embodiments, a color ink-jet printing apparatus having a barcode generation function comprises means for discriminating barcode information from an image to be printed, and means for reproducing black print information other than a barcode by mixing three colors, i.e., yellow, magenta, and cyan depending on the presence or absence of barcode information. With this arrangement, even when printing is done in large quantities, high-quality barcodes that do not result in lower reading performance can be printed. Even when the temperature of the ink-jet print head rises, a large number of high-quality barcodes can be printed at one time without requiring any complicated control, such as temporarily stopping printing to wait for a temperature drop, and without dropping the print throughput.

As described above, according to the present invention, a high-quality image can be formed-in a normal image forming mode, and specific images, such as a barcode, high precision of the print result can be maintained by preventing an increase in use frequency of a print head of at least a portion that requires the high precision.

<Third Embodiment>

The third embodiment of the present invention will be described below. In the third embodiment, since a barcode image is printed by a plurality of print heads, even when one of the print heads used for printing the barcode image has failed, a readable barcode can be printed.

Figure 12:
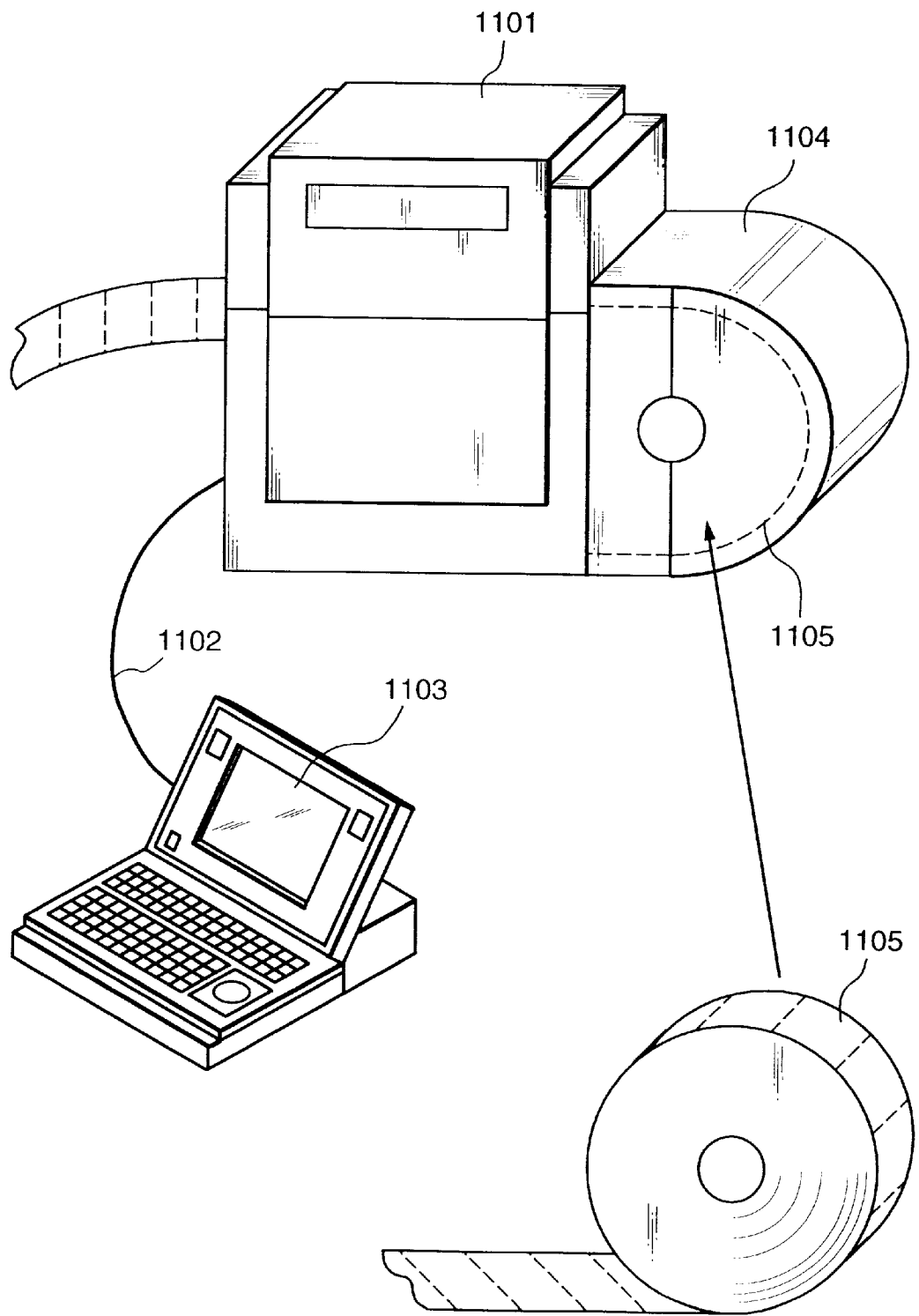
FIG. 12 is a perspective view showing the outer appearance of a color barcode printing apparatus according to the third embodiment of the present invention.

FIG. 12 is a perspective view showing the outer appearance of a color barcode printing apparatus according to the third embodiment. Reference numeral 1101 denotes a color barcode printing apparatus. Reference numeral 1102 denotes a printer cable, which connects a host computer 1103 and the color barcode printing apparatus to allow communications therebetween. Reference numeral 1103 denotes a host computer which transmits barcode data indicating a barcode to be printed to the color barcode printing apparatus 1101. Reference numeral 1104 denotes a roll paper holder, which holds roll paper 1105. Reference numeral 1105 denotes roll paper on which a barcode and the-like are printed on the color barcode printing apparatus 1101.

With the above-mentioned arrangement, the color barcode printing apparatus 1101 can print an image based on print data (barcode) received from the host computer 1103 connected via the printer cable 1102 on the roll paper 1105 as a printing medium housed in the roll paper holder 1104.

FIG. 13 is a block diagram showing the control arrangement of the color barcode printing apparatus according to this embodiment. Referring to FIG. 13, reference numeral 1200 denotes a microprocessor (MPU), which implements various kinds of control in the color barcode printing apparatus. Reference numeral 1201 denotes a program ROM which stores control programs executed by the MPU 1200. Reference numeral 1202 denotes a RAM which provides a work area used when the MPU 120 implements various kinds of control. Reference numeral 1203 denotes a CGROM which stores various character patterns. Reference numeral 1204 denotes a VRAM which stores bit patterns to be printed by print heads. The VRAM 1204 has image areas in units of color components, i.e., cyan, magenta, yellow, and black.

Reference numeral 1205 denotes a communication driver which implements communications with the host computer 1103. Reference numeral 1206 denotes motor drivers for driving motors 1207 for feeding the roll paper. Reference numeral 1208 denotes a head driving circuit for driving print heads corresponding to color components in accordance with bitmap data mapped on the VRAM 1204. Reference numeral 1209 denotes print heads, which are arranged in correspondence with color components (cyan (C), magenta (M), yellow (Y), and black (K)). Note that a barcode generator is built in the program ROM 1201. Reference numeral 1210 denotes an operation unit at which various setting operations for the barcode printing apparatus can be made.

The command system of print data according to the third embodiment is the same as in the first embodiment (FIGS. 7A to 7E). That is, print data consists of a start command 701 including setting data as a reference for printing, a plurality of fields 705 as data, and an end command 704 indicating the end of printing. Furthermore, each field 705 is divided into an attribute portion 702 including setting data of various attributes of data, and a data portion 703 as real data.

FIG. 7B shows the data architecture of the start command 701. The start command includes an identification code indicating that the command is a start command, a print reference position, an effective print region, the number of labels to be printed, and the like. FIG. 7C shows the data architecture of the field 705 in detail. The attribute portion 7G2 indicates which of a character, image, and barcode the data in this field corresponds to, and includes attribute information such as a size and the like. The data portion 703 shown in FIG. 7D includes the data length of the data, and real data. FIG. 7E shows the data architecture of the end command. The end command 704 includes an identification code indicating that the command is the end of the print command.

FIGS. 14A and 14B show the state wherein the print command received from the host computer is mapped on the VRAM 1204 by a conventional method. The VRAM 1204 is allocated with VRAM areas (K-VRAM 1400/C-VRAM 1401/M-VRAM 1402/Y-VRAM 1403) corresponding to the four-color heads, i.e., K (black), C (cyan), M (magenta), and Y (yellow) heads, and a barcode is drawn only on the K (black) VRAM area (K-VRAM 1400). As a result of printing using the four-color print heads 1209, a barcode label 1404 is obtained. In this case, if a problem has occurred in the black print head, a barcode cannot be normally printed on a barcode label 1404.

Figure 15:
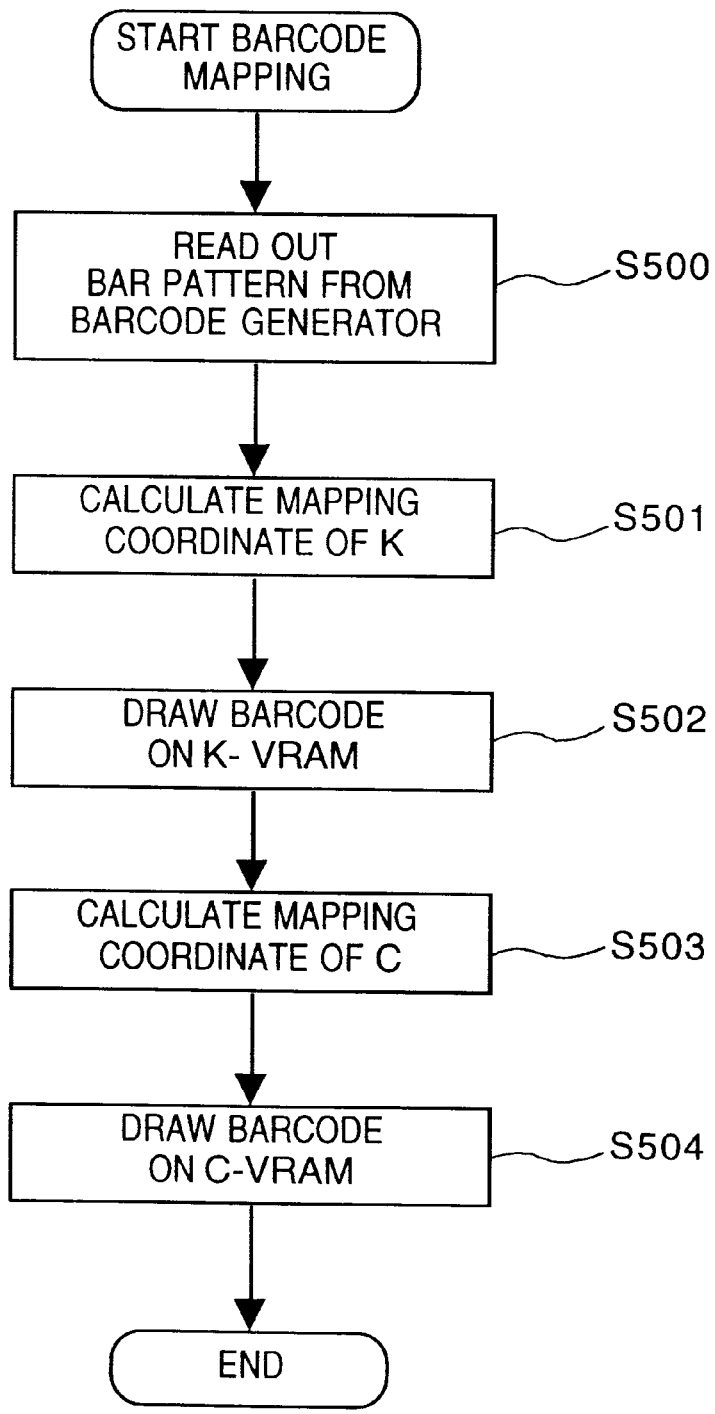
FIG. 15 is a flow chart showing the barcode mapping sequence according to the third embodiment.

FIG. 15 is a flow chart showing the barcode mapping sequence according to the third embodiment. In this embodiment, upon drawing a barcode on the VRAM 1204, the barcode is drawn on the K (black) and C (cyan) VRAM areas. When a field having an attribute of barcode data is detected from the input print data, the flow chart shown in FIG. 15 is started. In step S500, a bar pattern is read out from the barcode generator on the basis of real data included in the data portion of the corresponding field. In step S501, the mapping coordinates of a barcode pattern onto the black VRAM area (K-VRAM 1400) are calculated. In this case, attributes such as a barcode type, bar magnification, bar vertical size, and rotation, included in the attribute portion of the corresponding field are reflected. Subsequently, in step S502, a barcode is drawn on the K-VRAM 1400 in accordance with the mapping coordinates calculated in step S501.

Upon completion of the drawing of the barcode onto the K-VRAM 1400, the flow advances to step S503 to calculate mapping coordinates for mapping the barcode onto the C-VRAM 1401. In step S504, the barcode is drawn on the C-VRAM 1401 as the cyan VRAM area. As a result, identical barcodes are drawn at the same print positions on the K-VRAM 1400 and C-VRAM 1401.

FIGS. 16A and 16B show the state wherein the print command received from the host computer is mapped onto the VRAM 1204 using the barcode drawing sequence of the third embodiment described above with the aid of FIG. 15. Note that the print command is the same as that shown in FIGS. 14A and 14B. According to the sequence of the third embodiment, a barcode is drawn on the K-(black) VRAM area (1400) and C (cyan) VRAM area (1401). As a result, the barcode is printed on the barcode label 604 by overstriking black and cyan inks.

Note that the color of the barcode to be overstruck on the barcode printed in black is cyan in this embodiment. However, the present invention is not limited to such specific color. For example, magenta may be used. Alternatively, the user may designate the color to be overstruck on the barcode printed in black at the operation unit 1210. Furthermore, two colors used in overstriking may be designated.

When a barcode is printed by the above-mentioned method, even when a problem inherent to the print scheme has occurred in, for example a portion for printing a barcode of the black print head, since the cyan print head prints an identical barcode, that barcode can be printed in a readable state, and can be correctly recognized by a barcode reader.

<Fourth Embodiment>

In the third embodiment, the present invention is applied to the color barcode printing apparatus. The fourth embodiment will exemplify a case wherein the present invention is applied to a monochrome barcode printing apparatus. Since the outer appearance of the barcode printing apparatus of the fourth embodiment is the same as that of the third embodiment (FIG. 12), a detailed description thereof will be omitted.

Figure 17:
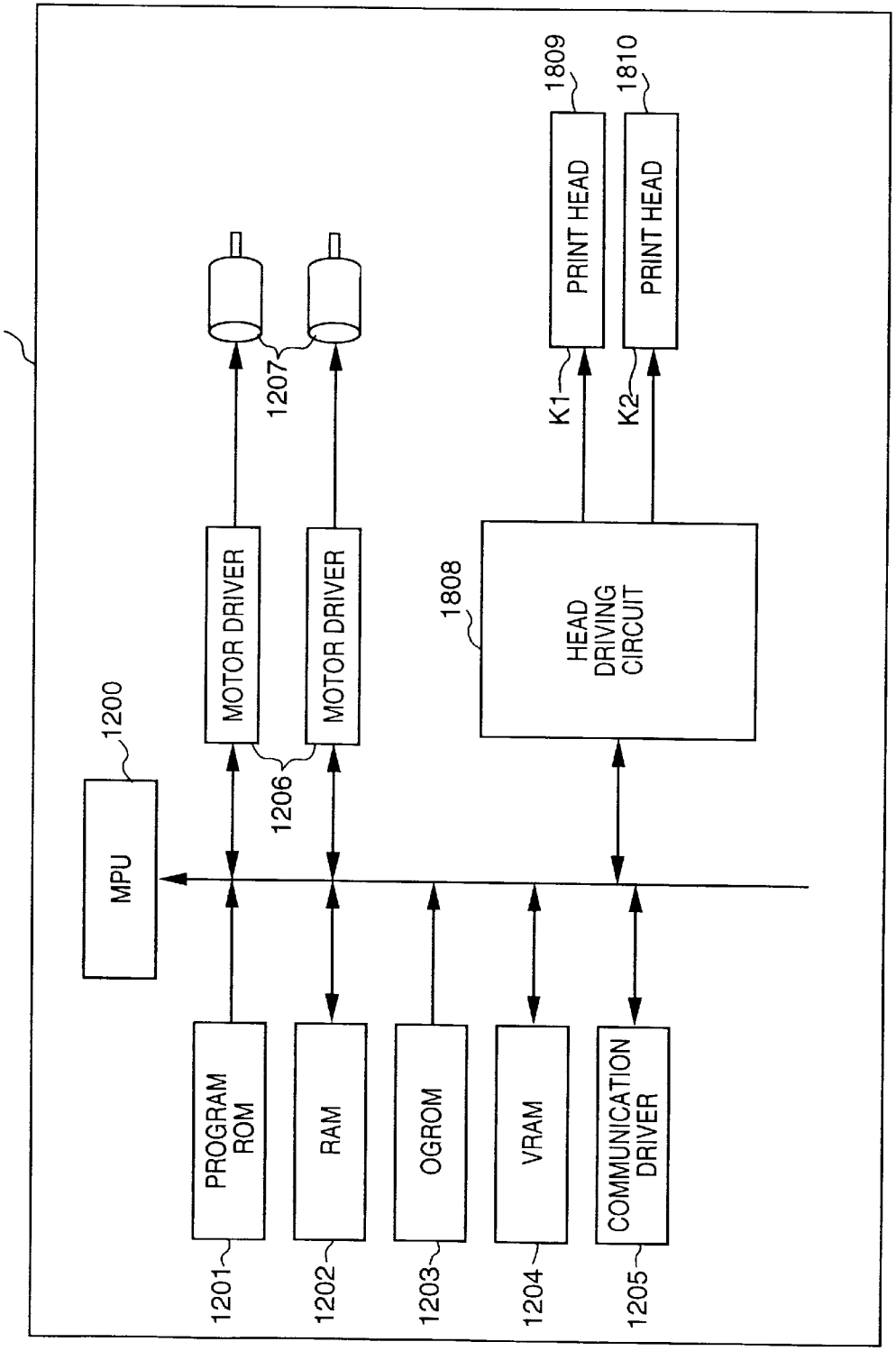
FIG. 17 is a block diagram showing the control arrangement of a barcode printing apparatus according to the fourth embodiment of the present invention.

FIG. 17 is a block diagram showing the control arrangement of the barcode printing apparatus of the fourth embodiment. The same reference numerals in FIG. 17 denote the same parts as in the arrangement shown in FIG. 13. Reference numeral 1808 denotes a head driving circuit for controlling driving of print heads 1809 and 1810. Both the print heads 1809 and 1810 print images in black. In the fourth embodiment, a VRAM 1204 has a drawing area (K1-VRAM) for the print head 1809, and a drawing area (K2-VRAM) for the print head 1810.

Figure 7A:
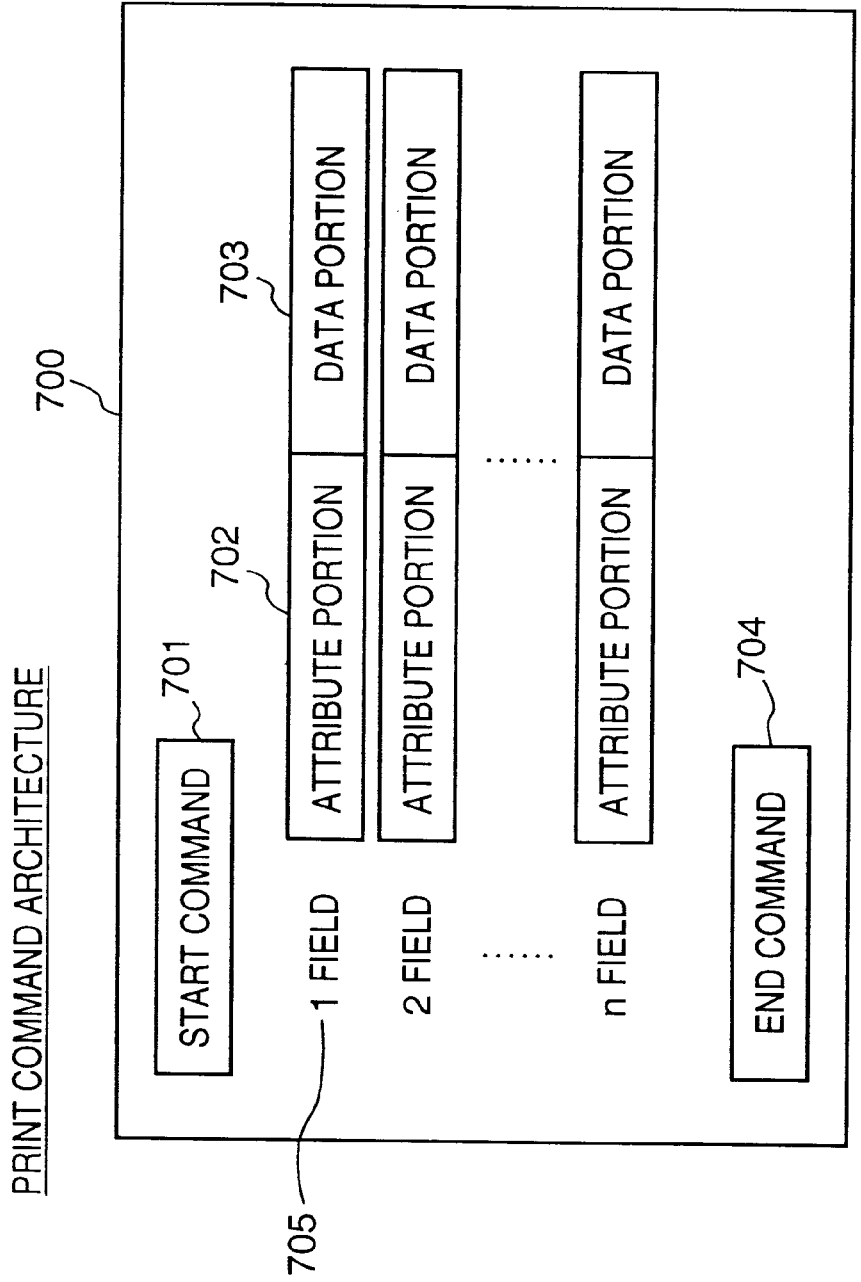

The command system of print data of the barcode printing apparatus according to the fourth embodiment is the same as that shown in FIG. 7A. Note that start and end commands are respectively the same as those shown in FIGS. 7B and 7E. Each field 705 includes an attribute portion 702 and a data portion 703, and their data architectures are as shown in FIGS. 18A to 18D. FIGS. 18A to 18D show the data architectures of field data according to the fourth embodiment. In the fourth embodiment, since monochrome printing is done, the attribute portion does not have attributes "character color", "drawing color", and the like as compared to the field data shown in FIG. 7C used in color printing.

Figure 19B:
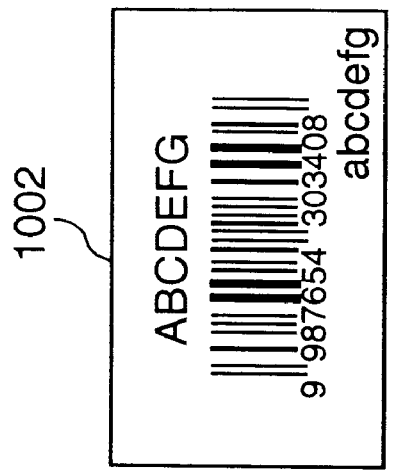
FIGS. 19A and 19B show state wherein a print image is drawn on a VRAM according to the fourth embodiment.
Figure 19A:
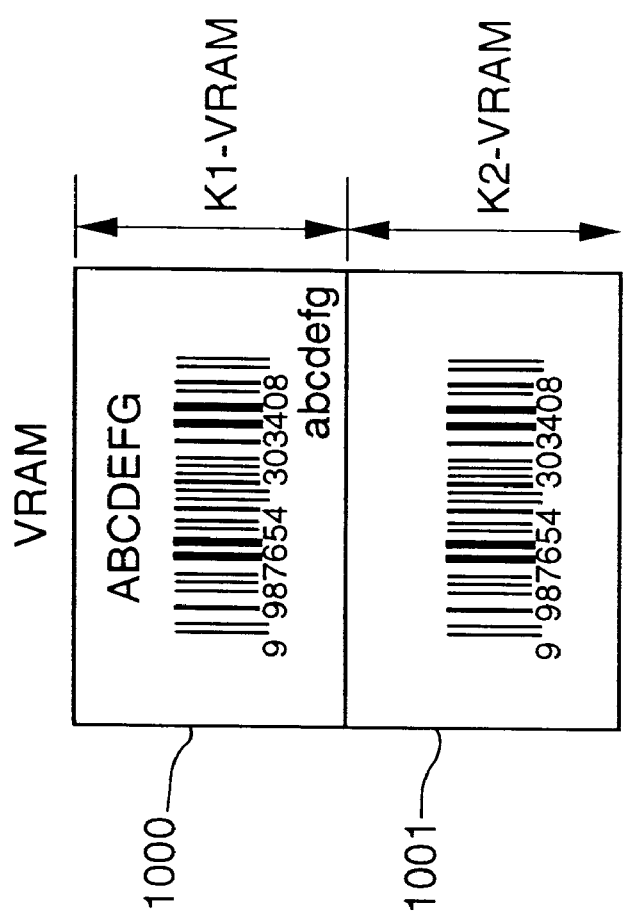

FIGS. 19A and 19B show the state wherein a print image is drawn on the VRAM according to the fourth embodiment. In the fourth embodiment, upon drawing a barcode on the VRAM 1204, the barcode is drawn on both the drawing area (K1-VRAM 1000) for the print head 1809, and the drawing area (K2-VRAM 1001) for the print head 1810. When the print heads 1809 and 1810 print the individual drawing data, a barcode label 1002 is obtained. In this embodiment, the K1-VRAM 1000 is an image area for normal monochrome printing, and the K2-VRAM 1001 is an image area which is used only when barcode data is present.

Figure 20:
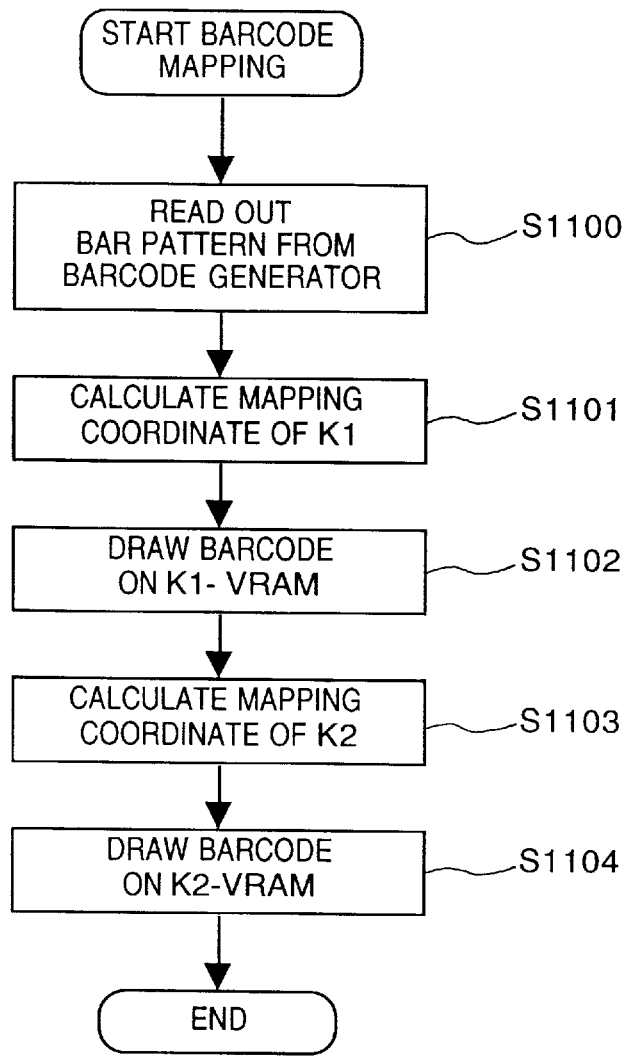
FIG. 20 is a flow chart for explaining the barcode mapping sequence according to the fourth embodiment.

The barcode image mapping sequence according to the fourth embodiment will be described below. FIG. 20 is a flow chart for explaining the barcode mapping sequence according to the fourth embodiment. When a field having attributes of barcode data is detected from the input print command, the flow chart shown in FIG. 20 is started.

In step S1100, a barcode pattern is read out from a barcode generator (program ROM 1201) on the basis of real data included in the data portion of the corresponding field. In step S1101, the mapping coordinates of the barcode pattern onto the VRAM area (K1-VRAM 1000) for the print head 1809 (K1) are calculated. In this case, attributes such as a barcode type, bar magnification, bar vertical size, rotation, and the like included in the attribute portion of the corresponding field are reflected. Subsequently, in step S1102, the barcode is drawn on the K1-VRAM 1000 in accordance with the mapping coordinates calculated in step S1101.

Upon completion of drawing of the barcode onto the K1-VRAM 1000, the flow advances to step S1103 to calculate the mapping coordinates for mapping the barcode onto the K2-VRAM 1001. In step S1104, the barcode is drawn on the K2-VRAM 1001. As a result, identical barcodes are drawn on the same print positions on the K1-VRAM 1000 and K2-VRAM 1001.

As described above, according to the fourth embodiment, a barcode is drawn on both the VRAM area (K1-VRAM 1000) used for mapping normal print data, and the dedicated VRAM area (K2-VRAM 1001) used for mapping a barcode. For this reason, even when a problem inherent to the print scheme has occurred in a portion for printing a barcode of the black print head for normal printing, since an identical barcode is printed by the black print head for barcode printing, the barcode can be correctly printed. That is, a barcode that can be read by a barcode reader can be printed.

As described above, according to the third and fourth embodiments, in a printing apparatus which has at least two print heads and prints a barcode on a printing medium, at least two print heads are controlled to print an identical barcode. For this reason, even when one of the print heads that are used to print a barcode have suffered a problem inherent to the print schemes (e.g., disconnection of a head or skew of a ribbon in the thermal transfer scheme; ejection errors of a head or mislanding of ink in the ink-jet scheme), since the other print head prints an identical barcode at the same position, the barcode can be accurately printed.

As described above, according to the third and fourth embodiments, even when some troubles have occurred in a print head for printing a specific image such as a barcode, a barcode that can be recognized can be printed.

In the third and fourth embodiments, the barcode data printing apparatus recognizes barcode data, and executes double-printing for a barcode image. However, as can be seen from the descriptions of the embodiments for those who are skilled in the art, the above-mentioned functions may be implemented by a printer driver provided to the host computer 1103, as has been described in the second embodiment. That is, a printer driver may discriminate a barcode image from print data, and may issue a command to the barcode printing apparatus to execute overstriking for the barcode image.

In the above embodiments, the color barcode printing apparatus and the monochrome barcode printing apparatus have been exemplified. However, the present invention is not limited to such specific printers as long as they can print barcodes.

Furthermore, the present invention can be applied to printing schemes other than the ink-jet scheme and thermal scheme. Also, in terms of overstriking a plurality of color components to form a barcode image, the present invention may be applied to a printing scheme that does not use any print heads, e.g., a printer of an electrostatic photography scheme.

The present invention brings about excellent effects especially in a print head and printing apparatus of the ink-jet system that prints by forming flying ink droplets using heat energy, among ink-jet print systems.

As the representative arrangement and principle of such ink-jet printing system, one practiced by use of the basic principle disclosed in, for example, U.S. Pat. Nos. 4,723,129 and 4,740,796 is preferred. The above system is applicable to both the on-demand type and continuous types. Particularly, in the case of the on-demand type, the system is effective because, by applying at least one driving signal, which corresponds to print information and gives a rapid temperature rise exceeding nucleus boiling, to each of electro-thermal conversion elements arranged in correspondence with a sheet or liquid channels holding liquid (ink), heat energy is generated by the electro-thermal conversion element to effect film boiling on the heat acting surface of the print head, and consequently, a bubble can be formed in the liquid (ink) in one-to-one correspondence with the driving signal. By ejecting the liquid (ink) through an ejection opening by growth and shrinkage of the bubble, at least one ink droplet is formed. If the driving signal is applied as a pulse signal, the growth and shrinkage of the bubble can be attained instantly and adequately to achieve ejection of the liquid (ink) with particularly high response characteristics.

As the pulse driving signal, signals disclosed in U.S. Pat. Nos. 4,463,359 and 4,345,262 are suitable. Note that further excellent printing can be performed by using the conditions described in U.S. Pat. No. 4,313,124 of the invention which relates to the temperature rise rate of the heat acting surface.

As an arrangement of the print head, in addition to the arrangement as a combination of orifices, liquid channels, and electro-thermal conversion elements (linear liquid channels or right-angled liquid channels) as disclosed in the above specifications, the arrangement using U.S. Pat. Nos. 4,558,333 and 4,459,600, which disclose an arrangement having a heat acting portion arranged in a bent region may be used. In addition, an arrangement based on Japanese Patent Laid-Open No.59-123670 which discloses an arrangement using a slit common to a plurality of electro-thermal conversion elements as an ejection portion of the electro-thermal conversion elements, or Japanese Patent Laid-Open No.59-138461 which discloses an arrangement having an opening for absorbing the pressure wave of heat energy in correspondence with an ejection portion, may be used.

Furthermore, as a full line type print head having a length corresponding to the width of a maximum print medium which can be printed by the printing apparatus, either an arrangement which satisfies the full-line length by combining a plurality of print heads as disclosed in the above specification or an arrangement as a single print head obtained by forming print heads integrally can be used.

In addition, an exchangeable chip type print head which can be electrically connected to the printing apparatus main body or can receive ink from the printing apparatus main body upon being mounted on the printing apparatus main body, or a cartridge type print head in which an ink tank is integrally arranged on the print head itself, may be used.

It is preferable to add recovery means for the print head, preliminary means, and the like to the arrangement of the printing apparatus of the present invention since printing can be further stabilized. Examples of such means include, for the print head, capping means, cleaning means, pressurization or suction means, and preheating means using electro-thermal conversion elements, another heating element, or a combination thereof. It is also effective for stable printing to execute a preliminary ejection mode which performs ejection independently of printing.

Furthermore, as a printing mode of the printing apparatus, the apparatus may have not only a printing mode using a main color alone such as black or the like, but also at least one of a multi-color mode using a plurality of different colors or a full-color mode achieved by color mixing, although such modes may be attained either by using an integrated print head or by combining a plurality of print heads.

Moreover, in the above-mentioned embodiments, ink is described as a liquid. Alternatively, the present invention may use even ink which is solid at room temperature or less, and ink which softens or liquefies at room temperature. Alternatively, since it is a common practice in the ink-jet scheme to perform temperature control of the ink itself within the range from 30° C. to 70° C. so that the ink viscosity falls within the stable ejection range, any types of ink may be used as long as they liquefy upon application of a use print signal.

In addition, in order to prevent a temperature rise caused by heat energy by positively utilizing it as energy for causing changes in state of the ink from the solid state to the liquid state, or to prevent evaporation of the ink, ink which is solid in a non-use state and liquefies upon heating may be used. In any case, the present invention can be applied to a case wherein ink which liquefies upon application of heat energy, such as ink which liquefies upon application of heat energy according to a print signal and is ejected in a liquid state, ink which begins to solidify when it reaches a print medium, or the like, is used. In this case, ink may oppose electro-thermal conversion elements while being held in the liquid or solid state in recess portions of a porous sheet or through holes, as described in Japanese Patent Laid-Open No.54-56847 or 60-71260. In the present invention, the above-mentioned film boiling system is most effective for the above-mentioned inks.

Note that the present invention may be applied to either a system constituted by a plurality of equipments (e.g., a host computer, an interface device, a reader, a printing apparatus, and the like), or an apparatus consisting of a single equipment (e.g., a copying machine, a facsimile apparatus, or the like).

The objects of the present invention are also achieved by supplying a storage medium, which prints a program code of a software program that can implement the functions of the above-mentioned embodiments to the system or apparatus, and reading out and executing the program code stored in the storage medium by a computer (or a CPU or MPU) of the system or apparatus.

In this case, the program code itself read out from the storage medium realizes the functions of the above-mentioned embodiments, and the storage medium which stores the program code constitutes the present invention.

As the storage medium for supplying the program code, for example, a floppy disk, hard disk, optical disk, magneto-optical disk, CD-ROM, CD-R, magnetic tape, nonvolatile memory card, ROM, and the like may be used.

The functions of the above-mentioned embodiments may be implemented not only by executing the readout program code by the computer but also by some or all of actual processing operations executed by an OS (operating system) running on the computer on the basis of an instruction of the program code.

Furthermore, the functions of the above-mentioned embodiments may be implemented by some or all-of actual processing operations executed by a CPU or the like arranged in a function extension board or a function extension unit, which is inserted in or connected to the computer, after the program code read out from the storage medium is written in a memory of the extension board or unit.

Figure 21:
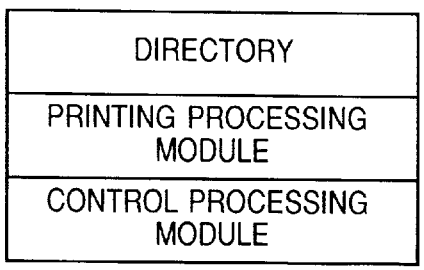
FIG. 21 shows a memory map of a storage medium that stores a control program according to the present invention.

When the present invention is applied to the storage medium, the storage medium stores program codes corresponding to the above-mentioned flow charts. An example of such program code will be briefly described below. In this case, modules shown in an example of the memory map shown in FIG. 21 are stored. FIG. 21 shows an example of the memory map of the storage medium that stores a control program according to the present invention. The storage medium of the present invention can store program codes of a "printing processing module" and "control processing module".

The printing processing module executes printing processing for printing a visible image based on image data on a printing medium using a plurality of print heads upon controlling a printing apparatus having the plurality of print heads. The control processing module implements control processing for controlling the printing processing to print a visible image based on specific image data using at least two print heads of the plurality of print heads at substantially-identical print positions.

As many apparently widely different embodiments of the present invention can be made without departing from the spirit and scope thereof, it is to be understood that the invention is not limited to the specific embodiments thereof except as defined in the claims.

What is claimed is:

1. An image forming apparatus having a plurality of print heads which respectively correspond to a plurality of colors, comprising:

receiving means for receiving image data;

discrimination means for discriminating an attribute of an image to be formed in accordance with the image data received by said receiving means;

determination means for determining if the image to be formed includes a barcode image portion based on a discrimination result of said discriminating means; and control means for, when said determination means determines that the image to be formed does not include the barcode image portion, performing image formation by assigning each of the plurality of print heads to a corresponding color and, when said determination means determines that the image to be formed includes the barcode image portion, performing image formation by assigning at least two of said plurality of print heads to an image portion to be printed in black other than the barcode image portion to represent black by mixing colors.

2. The apparatus according to claim 1, wherein said plurality of print heads include print heads of four colors, i.e., yellow, magenta, cyan, and black, and said control means assigns the black print head to the barcode image portion, and assigns the yellow, magenta, and cyan print heads to an image portion to be printed in black other than the barcode image portion to represent black by mixing colors.

3. The apparatus according to claim 2, wherein said determination means determines that the image to be formed does not include any barcode image portion, said control means forms the image portion to be printed in black using the black print head.

4. The apparatus according to claim 1, wherein said control means, when said determination means determines that the image to be formed includes the barcode image portion, performs image formation by assigning a print head for black to the barcode image portion.

5. The apparatus according to claim 1, wherein said plurality of print heads comprise an ink-jet head for printing by ejecting ink.

6. The apparatus according to claim 5, wherein said plurality of print heads comprise ink-jet print heads, which eject ink using heat energy, and comprise heat energy conversion elements for generating heat energy to be given to the ink.

7. The apparatus according to claim 6, wherein each of said print heads causes a change in state in the ink by the heat energy applied by the heat energy conversion element, and ejects the ink from an orifice on the basis of the change in state.

8. An image processing apparatus for controlling an image forming unit for forming an image using a plurality of print heads which respectively correspond to a plurality of colors, comprising:

discrimination means for discriminating an attribute of an image to be formed, in accordance with image data corresponding to the image to be formed, determination means for determining if the image to be formed includes a barcode image portion based on a discrimination result of said discrimination means; and control means for, when said determination means determines that the image to be formed does not include the barcode image portion, controlling said image forming unit to perform image formation by assigning each of the plurality of print heads to a corresponding color and, when said determination means determines that the image to be formed includes the barcode image portion, controlling said image forming unit to perform image formation by assigning at least two of said plurality of print heads to an image portion to be printed in black other than the barcode image portion to represent black by mixing colors.

9. The apparatus according to claim 8, wherein said image forming unit comprises print heads of four colors, i.e., yellow, magenta, cyan, and black, and said control means assigns the black print head to the barcode image portion, and assigns the yellow, magenta, and cyan print heads to an image portion to be printed in black other than the barcode image portion so as to control said image forming unit to represent black by mixing colors.

10. The apparatus according to claim 9, wherein when said determination means determines that the image to be formed does not include any barcode image portion, said control means controls said image forming unit to form the image portion to be printed in black using the black print head.

11. The apparatus according to claim 8, wherein said control means, when said determination means determines that the image to be formed includes the barcode image portion, performs image formation by assigning a print head for black to the barcode image portion.

12. An image processing method for controlling an image forming unit for forming an image using a plurality of print heads which respectively correspond to a plurality of colors, comprising the steps of:

receiving image data:

discriminating an attribute of an image to be formed in accordance with the image data received in said receiving step;

determining if the image to be formed includes a barcode image portion based on a discrimination result of said discrimination step;

controlling said image forming unit to perform image formation by assigning each of the plurality of print heads to a corresponding color, when determine d in said determination step that the image to be formed does not include the barcode image portion; and controlling said image forming unit to perform image formation by assigning at least two of said plurality of print heads to an image portion to be printed in black other than the barcode image portion to represent black by mixing colors, when determined in the determination step that the image to be formed includes the barcode image portion.

13. The method according to claim 12, wherein said image forming unit comprises print heads of four colors, i.e., yellow, magenta, cyan, and black, and the control step includes the step of assigning the black print head to the barcode image portion, and assigning the yellow, magenta, and cyan print heads to an image portion to be printed in black other than the barcode image portion so as to control said image forming unit to represent black by mixing colors.

14. The apparatus according to claim 13, wherein the control step includes the step of controlling said image forming unit to form the image portion to be printed in black using the black print head when it is determined in the determination step that the image to be formed does not include any barcode image portion.

15. An image processing apparatus for controlling an image forming unit having a plurality of print means including at least two print means for respectively printing a predetermined color, comprising:

discrimination means for discriminating an attribute of an image to be formed in accordance with image data corresponding to the image to be formed;

image forming means for printing the image based on the image data on a printing medium using said image forming unit; and control means for controlling said image forming means to print a barcode image portion, detected in accordance with a discrimination result of said discrimination means, by said at least two print means for the predetermined colors, wherein said control means controls said at least two print means to print the same barcode image, respectively.

16. An image processing method for generating print data on the basis of data transferred from host processing, and generating data to be output by a connected printing apparatus which has a plurality of print heads which respectively correspond to a plurality of colors, comprising the steps of:

discriminating an attribute of an image to be formed, in accordance with image data corresponding to the image to be formed;

determining if the image to be formed includes a barcode image portion based on a discrimination result of said discrimination step;

generating information to be printed by each of the plurality of print heads, by assigning each of the plurality of print heads to a corresponding color when determined in said determination step that the image to be formed does not include the barcode image portion; and generating information to be printed by at least two of said plurality of print heads in correspondence with an image portion other than the barcode image portion when determined in the determination step that the image to be formed includes the barcode image portion.

17. A computer readable memory that stores a program for generating data to be output to a predetermined printing apparatus which has a plurality of heads which respectively correspond to a plurality of colors on the basis of image data transferred from host processing, comprising:

a program code of a discrimination step of discriminating an attribute of an image to be formed, in accordance with the image data corresponding to the image to be formed;

a program code of a determination step of determining if the image to be formed based on information transferred from the host processing includes a barcode image portion, based on a discrimination result of said discrimination step;

a program code of a control step of generating information to be printed by each of the plurality of print heads, by assigning each of the plurality of print heads to a corresponding color when determined in the determination step that the image to be formed does not include the barcode image portion; and a program code of a control step of generating information to be printed by at least two of said plurality of print heads in correspondence with an image portion to be printed in black other than the barcode image portion when determined in the determination step that the image to be formed includes the barcode image portion.

18. An image forming apparatus having a plurality of print means including at least two print means for respectively printing a predetermined color, comprising:

receiving means for receiving image data;

discrimination means for discriminating an attribute of an image to be formed, in accordance with the image data received by said receiving means;

image forming means for printing the image based, on the image data on a printing medium using said plurality of print means; and control means for controlling said image forming means to print a barcode image portion, detected in accordance with a discrimination result of said discrimination means, by said at least two print means for the predetermined colors, wherein said control means controls said at least two print means to print the same barcode image, respectively.

19. The apparatus according to claim 18, wherein said plurality of print means comprises two print heads for forming images in an identical color, and said control means controls to print the image based on all image data including the barcode image data using one of said at least two print heads, and to print the barcode image portion alone using the other print head.

20. The apparatus according to claim 18, wherein said image forming means has image storage areas corresponding to said plurality of print means, and forms the image by printing image data stored in the individual storage areas by said print means, and said control means maps the barcode image data onto a plurality of image storage areas.

21. The apparatus according to claim 18, wherein said plurality of print means comprise ink-jet print heads for printing by ejecting ink.

22. The apparatus according to claim 21, wherein said print heads comprise ink-jet print heads, which eject ink using heat energy, and comprise heat energy conversion elements for generating heat energy to be given to the ink.

23. The apparatus according to claim 22, wherein each of said print heads causes a change in state in the ink by the heat energy applied by the heat energy conversion element, and ejects the ink from an orifice on the basis of the change in state.

24. An image processing method for controlling an image forming unit having a plurality of print means including at least two print means for respectively printing a predetermined color, comprising the steps of:

discriminating an attribute of an image to be formed in accordance with image data corresponding to the image to be formed;

printing the image based on the image data on a printing medium using said plurality of print means; and controlling the printing step to print a barcode image portion, detected in accordance with a discrimination result of said discrimination step, by said at least two print means for the predetermined colors, wherein the at least two print means are controlled to print the same barcode image, respectively.

25. The method according to claim 24, wherein said plurality of print means comprises two print heads for forming images in an identical color, and the control step includes the step of controlling to print the image based on all the image data including the barcode image data using one of said at least two print heads, and to print the barcode image portion alone using the other print head.

26. The method according to claim 24, wherein said image forming unit has image storage areas corresponding to said plurality of print means, and forms the image by printing image data stored in the individual storage areas by said print means, and the control step includes the step of mapping the barcode image data onto a plurality of image storage areas.

27. A computer readable memory that stores a control program for controlling an image forming unit having a plurality of print means including at least two print means for respectively printing a predetermined color, comprising:

a code of a discrimination step of discriminating an attribute of an image to be formed in accordance with image data corresponding to the image to be formed;

a code of an image forming step of printing the image based on the image data on a printing medium using said plurality of print means; and a code of a control step of controlling the image forming step to print a barcode image, detected in accordance with a discrimination result of said discrimination step, by said at least two print means for the predetermined colors, wherein the at least two print means are controlled to print the same barcode image, respectively.

28. The apparatus according to claim 18, wherein said control means assigns image data representing the barcode image portion to said at least two print means for the predetermined colors so that said at least two print means for the predetermined colors form the barcode image portion.

29. The apparatus according to claim 15, wherein said control means assigns image data representing the barcode image portion to said at least two print means for the predetermined colors so that said at least two print means for the predetermined colors form the barcode image portion.

30. An image forming apparatus for printing an image using a plurality of print means which respectively print a corresponding color of the image, comprising:

discrimination means for discriminating an attribute of an image to be formed in accordance with received image data to determine at least an image portion corresponding to barcode information and an image portion corresponding to information other than barcode information;

image forming means for printing the image by using the plurality of print means based on image data corresponding to the image to be printed; and controlling means for controlling said image forming means to print an image portion corresponding to barcode information by using at least two print means of the plurality of print means, wherein the at least two print means which print the image portion corresponding to the barcode information include print means corresponding to black and print means corresponding to a predetermined color other than black.

31. The apparatus according to claim 30, wherein the at least two print means which print the image portion corresponding to the barcode information include print means corresponding to black and print means corresponding to cyan.

32. An image forming method for printing an image using a plurality of print means which respectively print a corresponding color of the image, comprising the steps of:

discriminating an attribute of an image to be formed in accordance with received image data to determine at least an image portion corresponding to barcode information and an image portion corresponding to information other than barcode information;

printing the image by using the plurality of print means based on image data corresponding to the image to be printed; and controlling said printing step to print an image portion corresponding to barcode information by using at least two print means of the plurality of print means, wherein the at least two print means which print the image portion corresponding to the barcode information include print means corresponding to black and print means corresponding to a predetermined color other than black.

33. The method according to claim 32, wherein the at least two print means which print the image portion corresponding to the barcode information include print means corresponding to black and print means corresponding to cyan.

* * * * *

UNITED STATES PATENT AND TRADEMARK OFFICE
CERTIFICATE OF CORRECTION

PATENT NO. : 6,236,752 B1
DATED : May 22, 2001
INVENTOR(S) : Katayama et al.

It is certified that error appears in the above-identified patent and that said Letters Patent is hereby corrected as shown below:

Title page,
Item [73], Assignee,
"Mitsukaido" should read -- Mitsukaido, Japan --.

Column 1,
Line 17, "scheme" should read -- scheme, --.
Line 18, "ink" should read -- ink directly onto a printing sheet, may be roughly classified into --.
Line 31, "shcme," should read -- scheme, --.
Line 35, "ejext" should read -- eject --.

Column 3,
Line 47, "trouble," should read -- problem, --.

Column 5,
Line 62, "is" should read -- are --.
Line 64, "printer head." should read -- printhead. --.

Column 6,
Line 8, "of-print" should read -- of print --.

Column 7,
Line 9, "determine" should read -- determined --.

Column 9,
Line 20, "the-like" should read -- the like --.

Column 15,
Line 3, "substantially-" should read -- substantially --.

UNITED STATES PATENT AND TRADEMARK OFFICE
CERTIFICATE OF CORRECTION

PATENT NO.   : 6,236,752 B1
DATED        : May 22, 2001
INVENTOR(S)  : Katayama et al.

It is certified that error appears in the above-identified patent and that said Letters Patent is hereby corrected as shown below:

Column 16,
Line 52, "determine d" should read -- determined --.

Column 18,
Line 20, "based," should read -- based --.

Signed and Sealed this

Fifth Day of March, 2002

Attest:

*Attesting Officer*

JAMES E. ROGAN
*Director of the United States Patent and Trademark Office*